US009123333B2

(12) United States Patent
Amarilli et al.

(10) Patent No.: US 9,123,333 B2
(45) Date of Patent: Sep. 1, 2015

(54) MINIMUM BAYESIAN RISK METHODS FOR AUTOMATIC SPEECH RECOGNITION

(71) Applicant: Google Inc., Mountain View, CA (US)

(72) Inventors: Antoine Amarilli, Paris (FR); Mehryar Mohri, Mountain View, CA (US); Cyril Allauzen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 298 days.

(21) Appl. No.: 13/771,934

(22) Filed: Feb. 20, 2013

(65) Prior Publication Data

US 2014/0303973 A1 Oct. 9, 2014

Related U.S. Application Data

(60) Provisional application No. 61/700,098, filed on Sep. 12, 2012.

(51) Int. Cl.
| | |
|---|---|
| *G10L 15/26* | (2006.01) |
| *G10L 15/04* | (2013.01) |
| *G10L 15/18* | (2013.01) |
| *G10L 15/06* | (2013.01) |
| *G10L 15/08* | (2006.01) |

(52) U.S. Cl.
CPC ..................................... *G10L 15/08* (2013.01)

(58) Field of Classification Search
None
See application file for complete search history.

(56) References Cited

U.S. PATENT DOCUMENTS

| | | | |
|---|---|---|---|
| 4,741,036 A | 4/1988 | Bahl et al. | |
| 4,956,865 A | 9/1990 | Lennig et al. | |
| 5,086,385 A | 2/1992 | Launey et al. | |
| 5,233,681 A | 8/1993 | Bahl et al. | |
| 5,257,314 A | 10/1993 | Kimura et al. | |
| 5,278,942 A | 1/1994 | Bahl et al. | |
| 5,428,707 A | 6/1995 | Gould et al. | |
| 5,606,644 A | 2/1997 | Chou et al. | |
| 5,625,748 A | 4/1997 | McDonough et al. | |
| 5,675,704 A | 10/1997 | Juang et al. | |
| 5,799,276 A | 8/1998 | Komissarchik et al. | |
| 5,864,810 A | 1/1999 | Digalakis et al. | |

(Continued)

OTHER PUBLICATIONS

Allauzen, Cyril et al., "OpenFst: A General and Efficient Weighted Finite-State Transducer Library." In Proceedings of the 12th international conference on Implementation and application of automata, 2007, pp. 11-23. Springer-Verlag.

(Continued)

*Primary Examiner* — Satwant Singh
(74) *Attorney, Agent, or Firm* — McDonnell Boehnen Hulbert & Berghoff LLP

(57) ABSTRACT

A hypothesis space of a search graph may be determined. The hypothesis space may include n hypothesis-space transcriptions of an utterance, each selected from a search graph that includes t>n transcriptions of the utterance. An evidence space of the search graph may also be determined. The evidence space may include m evidence-space transcriptions of the utterance that are randomly selected from the search graph, where t>m. For each particular hypothesis-space transcription in the hypothesis space, an expected word error rate may be calculated by comparing the particular hypothesis-space transcription to each of the evidence-space transcriptions. Based on the expected word error rates, a lowest expected word error rate may be obtained, and the particular hypothesis-space transcription that is associated with the lowest expected word error rate may be provided.

18 Claims, 16 Drawing Sheets

(56) References Cited

U.S. PATENT DOCUMENTS

| | | |
|---|---|---|
| 5,895,447 A | 4/1999 | Ittycheriah et al. |
| 6,052,682 A | 4/2000 | Miller et al. |
| 6,064,959 A | 5/2000 | Young et al. |
| 6,073,097 A | 6/2000 | Gould et al. |
| 6,085,160 A | 7/2000 | D'Hoore et al. |
| 6,112,175 A | 8/2000 | Chengalvarayan |
| 6,138,095 A | 10/2000 | Gupta et al. |
| 6,151,575 A | 11/2000 | Newman et al. |
| 6,167,377 A | 12/2000 | Gillick et al. |
| 6,185,531 B1 | 2/2001 | Schwartz et al. |
| 6,223,159 B1 | 4/2001 | Ishii |
| 6,224,636 B1 | 5/2001 | Wegmann et al. |
| 6,236,963 B1 | 5/2001 | Naito et al. |
| 6,243,679 B1 | 6/2001 | Mohri et al. |
| 6,253,181 B1 | 6/2001 | Junqua |
| 6,332,122 B1 | 12/2001 | Ortega et al. |
| 6,334,102 B1 | 12/2001 | Lewis et al. |
| 6,418,411 B1 | 7/2002 | Gong |
| 6,456,975 B1 | 9/2002 | Chang |
| 6,470,314 B1 | 10/2002 | Dharanipragada et al. |
| 6,519,562 B1 | 2/2003 | Phillips et al. |
| 6,567,776 B1 | 5/2003 | Chang et al. |
| 6,804,647 B1 | 10/2004 | Heck et al. |
| 6,865,528 B1 | 3/2005 | Huang et al. |
| 6,901,364 B2 | 5/2005 | Nguyen et al. |
| 6,915,259 B2 | 7/2005 | Rigazio et al. |
| 6,941,264 B2 | 9/2005 | Konopka et al. |
| 6,999,926 B2 | 2/2006 | Yuk et al. |
| 7,062,436 B1 | 6/2006 | Odell et al. |
| 7,076,428 B2 | 7/2006 | Anastasakos et al. |
| 7,092,888 B1 | 8/2006 | McCarthy et al. |
| 7,269,555 B2 | 9/2007 | Yuk et al. |
| 7,328,154 B2 | 2/2008 | Mutel et al. |
| 7,337,115 B2 | 2/2008 | Liu et al. |
| 7,418,386 B2 | 8/2008 | Lai et al. |
| 7,437,296 B2 | 10/2008 | Inoue et al. |
| 7,499,857 B2 | 3/2009 | Gunawardana |
| 7,584,102 B2 | 9/2009 | Hwang et al. |
| 7,668,718 B2 | 2/2010 | Kahn et al. |
| 7,680,659 B2 | 3/2010 | Gao et al. |
| 7,725,316 B2 | 5/2010 | Chengalvarayan et al. |
| 7,729,909 B2 | 6/2010 | Rigazio et al. |
| 7,756,708 B2 | 7/2010 | Cohen et al. |
| 7,822,603 B1 | 10/2010 | Parthasarathy et al. |
| 7,822,605 B2 | 10/2010 | Zigel et al. |
| 7,912,447 B2 | 3/2011 | Bennett, III et al. |
| 8,014,591 B2 | 9/2011 | Baker |
| 8,032,537 B2 | 10/2011 | Consul et al. |
| 8,050,908 B2 | 11/2011 | Mohri et al. |
| 8,082,147 B2 | 12/2011 | Parthasarathy et al. |
| 8,095,356 B2 | 1/2012 | Kempe et al. |
| 8,260,615 B1 | 9/2012 | Nakajima et al. |
| 8,296,138 B2 | 10/2012 | Parthasarathy et al. |
| 8,306,819 B2 | 11/2012 | Liu et al. |
| 8,346,551 B2 | 1/2013 | Herbig et al. |
| 8,554,559 B1* | 10/2013 | Aleksic et al. ............ 704/235 |
| 8,589,164 B1* | 11/2013 | Mengibar et al. .......... 704/257 |
| 8,768,698 B2* | 7/2014 | Mengibar et al. .......... 704/244 |
| 8,781,833 B2* | 7/2014 | Duta et al. ................. 704/257 |
| 8,805,684 B1* | 8/2014 | Aleksic et al. ............ 704/244 |
| 8,880,398 B1* | 11/2014 | Aleksic et al. ............ 704/235 |
| 2002/0049600 A1 | 4/2002 | L'Esperance et al. |
| 2002/0055844 A1 | 5/2002 | L'Esperance et al. |
| 2002/0087987 A1 | 7/2002 | Dudkiewicz et al. |
| 2002/0123891 A1 | 9/2002 | Epstein |
| 2003/0050780 A1 | 3/2003 | Rigazio et al. |
| 2004/0088162 A1 | 5/2004 | He et al. |
| 2004/0093210 A1 | 5/2004 | Toyama |
| 2004/0107099 A1 | 6/2004 | Charlet |
| 2004/0230424 A1 | 11/2004 | Gunawardana |
| 2004/0249628 A1 | 12/2004 | Chelba et al. |
| 2005/0028208 A1 | 2/2005 | Ellis et al. |
| 2005/0044053 A1 | 2/2005 | Moreno et al. |
| 2005/0131688 A1 | 6/2005 | Goronzy et al. |
| 2006/0009972 A1 | 1/2006 | Yuk et al. |
| 2006/0074664 A1 | 4/2006 | Lam et al. |
| 2006/0132326 A1 | 6/2006 | Fang et al. |
| 2006/0149544 A1* | 7/2006 | Hakkani-Tur et al. ........ 704/236 |
| 2007/0005355 A1 | 1/2007 | Tian et al. |
| 2007/0129943 A1 | 6/2007 | Lei et al. |
| 2008/0010057 A1 | 1/2008 | Chengalvarayan et al. |
| 2008/0091423 A1 | 4/2008 | Roy et al. |
| 2008/0120112 A1 | 5/2008 | Jordan et al. |
| 2008/0126089 A1* | 5/2008 | Printz et al. ................. 704/235 |
| 2008/0177545 A1 | 7/2008 | Li et al. |
| 2008/0195389 A1 | 8/2008 | Zhang et al. |
| 2008/0215311 A1 | 9/2008 | Chelba et al. |
| 2008/0270449 A1 | 10/2008 | Gossweiler et al. |
| 2008/0312926 A1 | 12/2008 | Vair et al. |
| 2009/0024390 A1 | 1/2009 | Deshmukh et al. |
| 2009/0063483 A1 | 3/2009 | Chen et al. |
| 2009/0112592 A1 | 4/2009 | Candelore |
| 2010/0057453 A1 | 3/2010 | Valsan |
| 2010/0076765 A1 | 3/2010 | Zweig et al. |
| 2010/0114572 A1 | 5/2010 | Tani et al. |
| 2010/0138222 A1 | 6/2010 | Herbig et al. |
| 2010/0169094 A1 | 7/2010 | Akamine et al. |
| 2010/0228548 A1 | 9/2010 | Liu et al. |
| 2010/0296654 A1 | 11/2010 | Wilson et al. |
| 2010/0312557 A1 | 12/2010 | Strom et al. |
| 2010/0332235 A1 | 12/2010 | David |
| 2011/0029307 A1 | 2/2011 | Parthasarathy et al. |
| 2011/0054895 A1 | 3/2011 | Phillips et al. |
| 2011/0055256 A1 | 3/2011 | Phillips et al. |
| 2011/0067059 A1 | 3/2011 | Johnston et al. |
| 2011/0134320 A1 | 6/2011 | Daly |
| 2011/0213613 A1 | 9/2011 | Cohen et al. |
| 2011/0313775 A1 | 12/2011 | Laligand et al. |
| 2012/0072212 A1 | 3/2012 | Parthasarathy et al. |
| 2012/0078621 A1 | 3/2012 | Kanevsky et al. |
| 2012/0109651 A1 | 5/2012 | Chen |
| 2012/0150539 A1 | 6/2012 | Jeon et al. |
| 2014/0006029 A1* | 1/2014 | Stanley et al. ............. 704/254 |
| 2015/0039306 A1* | 2/2015 | Sidi et al. .................. 704/235 |

OTHER PUBLICATIONS

Allauzen, Cyril et al., "OpenFst: A General and Efficient Weighted Finite-State Transducer Library," http://www.stringology.org/event/CIAA2007/pres/Tue2/Riley.pdf, Jul. 17, 2007, pp. 1-36.

Bahl et al., "A Maximum Likelihood Approach to Continuous Speech Recognition," IEEE Transactions on Pattern Analysis and Machine Intelligence, Mar. 1983, pp. 179-190, vol. PAMI-5, No. 2.

Goel et al., "Minimum Bayes-Risk Automatic Speech Recognition." Computer Speech & Language, 2000, pp. 115-135, vol. 14, No. 2.

Joachims et al., "SVMstruct-Support Vector Machine for Complex Outputs," Cornell University, Department of Computer Science, Aug. 14, 2008, pp. 1-6.

Ljolje et al. "Efficient general lattice generation and rescoring." Sixth European Conference on Speech Communication and Technology, 1999, pp. 1-4.

Mangu et al., "Finding consensus in speech recognition: word error minimization and other applications of confusion networks," Computer Speech & Language, 2000, pp. 373-400, vol. 14, No. 4.

Mohri et al., "The Design Principles of a Weighted Finite-State Transducer Library," Theoretical Computer Science, 2000, pp. 17-32, vol. 231, No. 1.

Mohri et al., "Weighted Finite-State Transducers in Speech Recognition," Computer Speech & Language, 2002, pp. 69-88, vol. 16, No. 1.

Mohri, Mehryar. "Weighted Finite-State Transducer Algorithms. An Overview." Studies in Fuzziness and Soft Computing, 2004, pp. 551-564, vol. 148.

Mohri, M., "Edit-Distance of Weighted Automata: General Definitions and Algorithms," International Journal of Foundations of Computer Science, 2003, pp. 957-982, vol. 14, No. 06.

Mohri et al., "A Rational Design for a Weighted Finite-State Transducer Library." Automata Implementation, 1998, pp. 144-158.

"OpenFst Examples," http://www.openfst.org/twiki/bin/view/FST/FstExamples, pp. 1-9.

(56) References Cited

OTHER PUBLICATIONS

Post et al., "Weight pushing and binarization for fixed-grammar parsing," in Proceedings of the 11th International Conference on Parsing Technologies Association for Computational Linguistics, 2009, pp. 89-98.
Schulter, R. et al., "Bayes Risk Minimization Using Metric Loss Functions," In Proceedings of the European Conference on Speech Communication and Technology, Interspeech, 2005, pp. 1449-1452.
Stolcke, Andreas et al., "Explicit word error minimization in N-best list rescoring." In Proc. Eurospeech, 1997, pp. 163-166, vol. 1.
Tsochantaridis et al., "Large Margin Methods for Structured and Interdependent Output Variables," Journal of Machine Learning Research, 2005, pp. 1453-1484, vol. 6.
Xu, Haihua et al., "Minimum Bayes Risk Decoding and System Combination Based on a Recursion for Edit Distance." Computer Speech & Language, 2011, pp. 802-828, vol. 25, No. 4.
Fong et al., "Detecting Word Substitutions in Text," IEEE Transactions on Knowledge and Data Engineering, Aug. 2008, vol. 20, No. 8, pp. 1067-1076.
Fontanari, Jose F., "Minimal models for text production and Zipf's law," Integration of Knowledge Intensive Multi-Agent Systems, KIMAS 2005, pp. 297-300.
Varadarajan, Balakrishnan et al., "Quick FMLLR for Speaker Adaptation in Speech Recognition." IEEE International Conference on Acoustics, Speech and Signal Processing, 2008. ICASSP 2008, Mar. 31, 2008-Apr. 4, 2008, pp. 4297-4300.
Velivelli et al., "Automatic Video Annotation by Mining Speech Transcripts," Proceedings of the 2006 Conference on Computer Vision and Pattern Recognition Workshop, 2006, pp. 1-8.
Zhang, Shilei et al., "Model Dimensionality Selection in Bilinear Transformation for Feature Space MLLR Rapid Speaker Adaptation," 2012 IEEE International Conference on Acoustics, Speech and Signal Processing (ICASSP), Mar. 25-30, 2012, pp. 4353-4356.
Office Action for U.S. Appl. No. 13/653,804 mailed Apr. 2, 2013, 35 pages.
Office Action for U.S. Appl. No. 13/653,792 mailed Mar. 27, 2013, 26 pages.
Office Action for U.S. Appl. No. 13/666,223 mailed Apr. 8, 2013, 7 pages.
Final Office Action for U.S. Appl. No. 13/461,093 mailed Jan. 14, 2013, 25 pages.
"A Brief Introduction to Perceptrons," pp. 1-2, www.cs.utsa.edu/~bylander/cs5233/perceptron.pdf (Accessed Apr. 20, 2012).
Breslin, C. et al., "Prior Information for Rapid Speaker Adaptation," In Proceedings of Interspeech, pp. 1644-1647 (2010).
Collins and Koo, "Discriminative Reranking for Natural Language Parsing," Computational Linguistics, vol. 31, No. 1, pp. 25-70 (Mar. 2005).
Collins, Michael, "Discriminative Reranking for Natural Language Parsing," Proc 17th International Conf on Machine Learning, vol. 31, Issue: 1, Publisher: Morgan Kaufmann, San Francisco, CA, pp. 175-182 (2000).
Ferras, Marc et al., "Constrained MLLR for Speaker Recognition," IEEE International Conference on Acoustics, Speech and Signal Processing (ICASSP 2007), vol. 4, pp. IV-53 to IV-56 (2007).
Gales, M.J.F., "Maximum Likelihood Linear Transformations for HMM-based Speech Recognition," CUED/F-INFENG/TR 291, Tech. Rep., Cambridge University Engineering Department, pp. 1-19 (May 1997).
Glass, James and Zue, Victor, Lecture 7, Pattern Classification, pp. 1-33, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture7.pdf (Accessed Apr. 20, 2012).
Glass, James and Zue, Victor, Lecture 9, Dynamic Time Warping & Search, pp. 1-33, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture9.pdf (Accessed Apr. 20, 2012).
Glass, James and Zue, Victor, Lecture 10, Hidden Markov Modelling, pp. 1-33, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture10.pdf (Accessed Apr. 20, 2012).
Glass, James and Zue, Victor, Lecture 11-12, Language Modelling for Speech Recognition, pp. 1-47, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture1112.pdf (Accessed Apr. 20, 2012).
Glass, James and Zue, Victor, Lecture 13, A Practical Introduction to Graphical Models and their use in ASR, pp. 1-37, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture13.pdf (Accessed Apr. 20, 2012).
Glass, James and Zue, Victor, Guest Lecture 14 by Rita Singh, Part I: Designing HMM-based ASR systems, pp. 1-68, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture14.pdf (Accessed Apr. 20, 2012).
Glass, James and Zue, Victor, Guest Lecture 15 by Rita Singh, Part I: Designing HMM-based ASR systems, Part II: Training continuous density HMMS, pp. 1-66, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture15.pdf (Accessed Apr. 20, 2012).
Glass, James and Zue, Victor, Lecture 17, Finite-State Techniques for Speech Recognition, pp. 1-34, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture17.pdf (Accessed Apr. 20, 2012).
Glass, James and Zue, Victor, Lecture 18, ASR for Spoken-Dialogue Systems, pp. 1-34, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture18.pdf (Accessed Apr. 20, 2012).
Goodman, Joshua T., "A Bit of Progress in Language Modeling Extended Version," Computers & Electrical Engineering, vol. 37, Issue 4, pp. 559-569 (Jul. 2011).
Hall et al., "MapReduce/Bigtable for Distributed Optimization," Neural Information Processing Systesm Workshop on Leaning on Cores, Clusters, and Clouds, pp. 1-7 (2010).
Hasegawa-Johnson, Mark, Lecture 2: Acoustic Features, Acoustic Model Training, and Unix Scripting, pp. 1-16 (Jan. 8, 2009).
Leggetter, C.J. et al., "Maximum likelihood linear regression for speaker adaptation of continuous density hidden Markov models," Computer Speech and Language, vol. 9, pp. 171-185 (1995).
Lei et al., "Robust Feature Space Adaptation for Telephony Speech Recognition." In Proc. ICSLP, pp. 773-776 (2006).
Li, Yongxin et al., "Incremental On-Line Feature Space MLLR Adaptation for Telephony Speech Recognition." In International Conference on Spoken Language Processing, Denver, pp. 1417-1420 (2002).

(56) References Cited

OTHER PUBLICATIONS

Matsoukas et al., "Improved Speaker Adaptation Using Speaker Dependent Feature Projections," IEEE Workshop on Automatic Speech Recognition and Understanding (ASRU'03), pp. 273-278 (2003).

McDonald et al., "Distributed Training Strategies for the Structure Perceptron," Proceeding HLT '10 Human Language Technologies: The 2010 Annual Conference for the North American Chapter of the Association for Computational Linguistics, pp. 1-9 (2010).

Mohri et al., "Speech Recognition with Weighted Finite-State Transducers," Springer Handbook on Speech Processing and Speech Communication, Part E, Chapter 28, pp. 1-31 (2008).

Mohri, Mehryar, "Weighted Automata Algorithms," Handbook of Weighted Automata. Monographs in Theoretical Computer Science, pp. 213-254, Springer (2009).

Mohri et al., "Weighted Finite-State Transducers in Speech Recognition," Department of Computer & Information Science, Departmental Papers (CIS), University of Pennsylvania, pp. 1-13 (May 14, 2004), www.cs.nyu.edu/~mohri/pub/csl01.pdf.

Rabiner et al., "Introduction to Digital Speech Processing," Foundations and Trends in Signal Processing, vol. 1, Nos. 1-2, pp. 1-194 (2007).

Reynolds, Douglas, "Gaussian mixture models." Encyclopedia of Biometric Recognition, pp. 12-17 (2008).

Reynolds et al., "Speaker Verification Using Adapted Gaussian Mixture Models," Digital Signal Processing, vol. 10, pp. 19-41 (2000).

Reynolds et al., "Robust Text-Independent Speaker Identification Using Gaussian Mixture Speaker Models," IEEE Transactions on Speech and Audio Processing, vol. 3, No. 1, pp. 72-83 (Jan. 1995).

Roark et al., "Discriminative n-gram language modeling," Computer Speech and Language, vol. 21, pp. 373-392 (2007).

Roark et al., "Discriminative Language Modeling with Conditional Random Fields and the Perceptron Algorithm," ACL'04 Proceedings of the 42nd Annual Meeting on Association for Computational Linguistics, pp. 1-8 (2004).

Rosell, Magnus "An Introduction to Front-End Processing and Acoustic Features for Automatic Speech Recognition," pp. 1-10 (Jan. 17, 2006) Swedish national graduate school of language technology "GSLT". www.csc.kth.se/~rosell/courses/rosell_acoustic_features.pdf.

Saon, George, et al., "Eliminating Inter-Speaker Variability Prior to Discriminant Transforms." IEEE Workshop on Automatic Speech Recognition and Understanding (ASRU'01) pp. 73-76 (2001).

Saon, George, et al., "Linear feature space projections for speaker adaptation." 2001 IEEE International Conference on Acoustics, Speech, and Signal Processing (ICASSP'01) vol. 1, pp. 325-328, (2001).

Saraclar et al, "Joint Discriminative Language Modeling and Utterance Classification," IEEE International Conference on Acoustics, Speech and Signal Processing (ICASSP'05) vol. 1, pp. 561-564 (2005).

Tran, Dat et al., "Fuzzy Gaussian Mixture Models for Speaker Recognition," In Proceedings of the International Conference on Spoken Language Processing, pp. 759-762 (1998).

Woodland, Phil C. "Speaker Adaptation for Continuous Density HMMs: A Review." In ISCA Tutorial and Research Workshop (ITRW) on Adaptation Methods for Speech Recognition, pp. 11-19 (Aug. 29-30, 2001).

Notice of Allowance for U.S. Appl. No. 13/456,671 mailed Oct. 9, 2012, 8 pages.

Office Action for U.S. Appl. No. 13/461,093 mailed Aug. 2, 2012, 18 pages.

Office Action for U.S. Appl. No. 13/456,671 mailed Jun. 13, 2012, 16 pages.

\* cited by examiner

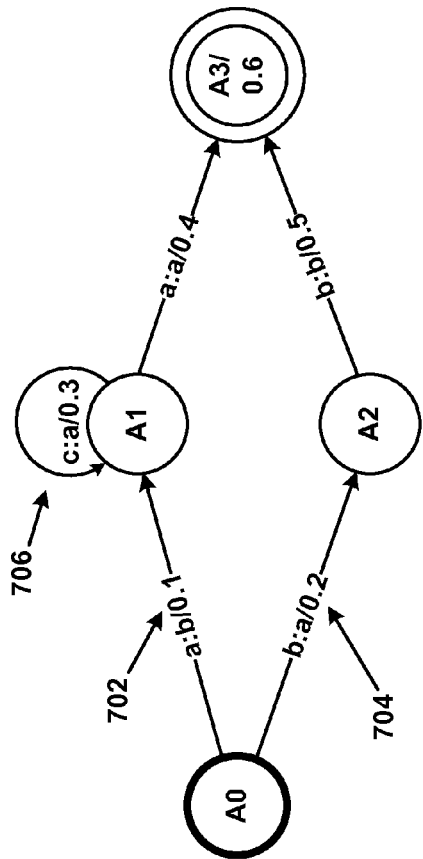
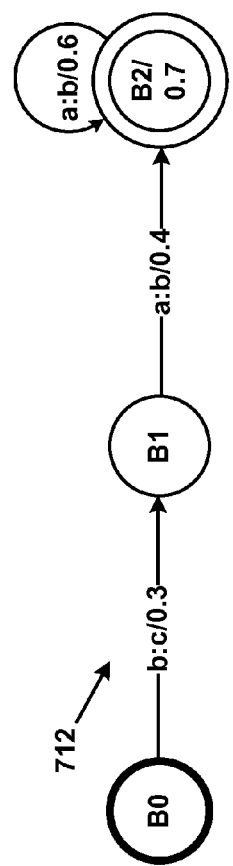
FIG. 7A
FIG. 7B

1108

ε:<i>/1
w2:<d>/1
w1:<d>/1
w2:<s>/1
w1:<s>/1
w1:w1/0
w2:w2/0

1106

<i>:w2/1
<i>:w1/1
<d>:ε/1
<s>:w2/1
<s>:w1/1
w1:w1/0
w2:w2/0

MINIMUM BAYESIAN RISK METHODS FOR AUTOMATIC SPEECH RECOGNITION

CROSS-REFERENCE TO RELATED APPLICATION

This application is entitled to the benefit of provisional U.S. patent application Ser. No. 61/700,098, which is hereby incorporated by reference in its entirety.

BACKGROUND

Search graphs, or lattices, in automatic speech recognition (ASR) systems can be used to map an input utterance to one or more output text strings. Some implementations attempt to select text string(s) that have a minimal probability of having one or more word errors. It may be more accurate to instead select text strings that have the smallest expected word error rate (e.g., the smallest edit distance) to a correct transcription of the utterance. However, doing so can be computationally expensive.

SUMMARY

In a first example embodiment, n hypothesis-space transcriptions of an utterance may be selected from a search graph that includes t>n transcriptions of the utterance. Additionally, m evidence-space transcriptions of the utterance may also be randomly selected from the search graph, where t>m. For particular hypothesis-space transcriptions, an expected word error rate may be calculated by comparing the particular hypothesis-space transcription to each of the evidence-space transcriptions. Based on the expected word error rates, a lowest expected word error rate may be obtained, and the particular hypothesis-space transcription that is associated with the lowest expected word error rate may be provided.

A second example embodiment may include a non-transitory computer-readable storage medium, having stored thereon program instructions that, upon execution by a computing device, cause the computing device to perform operations in accordance with the first and/or second example embodiments.

A third example embodiment may include a computing device, comprising at least a processor and data storage. The data storage may contain program instructions that, upon execution by the processor, operate in accordance with the first and/or second example embodiments.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIGS. 7A and 7B depict finite state transducers (FSTs), in accordance with example embodiments.

DETAILED DESCRIPTION

1. Overview

Figure 1:
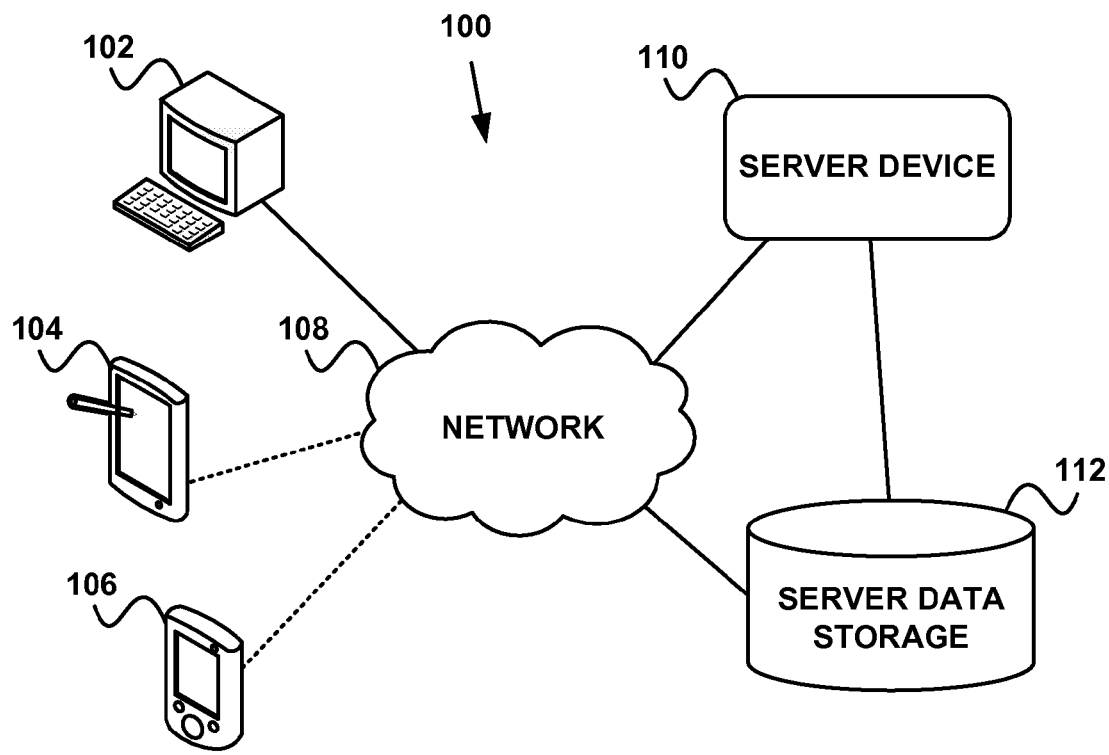
FIG. 1 depicts a distributed computing architecture, in accordance with an example embodiment.

One method of selecting a transcription of an utterance is to use a maximum a posteriori (MAP) technique. Formally, given an utterance x, MAP techniques attempt to find a transcription y that maximizes $P(y|x)$, the probability that the transcription is correct given the utterance.

However, the MAP technique selects a transcription that minimizes the likelihood of transcription-level error. This transcription may be referred to as $y_{best}$. For example, if $y_{best}$ is a sentence, the MAP technique minimizes the probability of $y_{best}$ having at least one word error.

A potentially more accurate metric of ASR performance is word error rate (WER). The WER between a particular transcription and the correct transcription, $y^*$, may be defined as the number of edits (substitutions, deletions or insertions) needed to change the particular transcription into $y^*$ divided by the number of words in $y^*$. This number of edits may also be referred to as the Levenshtein edit distance.

Minimizing WER, rather than transcription-level error, is motivated by the observation that some transcription-level errors matter more than others. For example, the best transcription as given by the MAP technique may have more word errors when compared to a correct transcription of the utterance than other possible transcriptions with lower probabilities than $y_{best}$. Put another way, WER gives partial credit for correctly recognizing portions of sentences, whereas MAP techniques generally do not.

Minimum Bayesian Risk (MBR) techniques can be used to take WER (or a more general loss function) into consideration when selecting a transcription. MBR techniques can be tuned to select a transcription that is optimal with respect to a loss function that represents a cost when the ASR system erroneously produces a transcription y instead of $y^*$. If this loss function is the Levenshtein edit distance, then the MBR technique selects a transcription that is optimal with respect to WER.

Nonetheless, determining a transcription using the MBR technique is expensive compared to using the MAP technique. For instance, a sum of weighted probabilities over the entire language is calculated. Also, each pair of possible transcriptions in the language is compared and the loss function between them is determined. For the Levenshtein edit distance, the running time of the loss function over strings y and z is $O(|y|\|z|)$.

One way of improving the running time of the MBR technique is to limit the search graph. The embodiments herein disclose several ways of doing so, and include a number of ways of representing the search graph that may facilitate efficient implementations.

The above processes, and example embodiments thereof, will be described in detail in Sections 5, 6, and 7. However, in order to further embody possible ASR system implementations, the next four sections describe, respectively, example computing systems and devices that may support ASR systems, an overview of ASR system components and functions, an overview of ASR system operation, and an overview of speaker adaptation.

2. Example Communication System and Device Architecture for Supporting Automatic Speech Recognition The methods, devices, and systems described herein can be implemented using client devices and/or so-called "cloud-based" server devices. Under various aspects of this paradigm, client devices, such as mobile phones, tablet computers, and/or desktop computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

Furthermore, the "server devices" described herein may not necessarily be associated with a client/server architecture, and therefore may also be referred to as "computing devices." Similarly, the "client devices" described herein also may not necessarily be associated with a client/server architecture, and therefore may be interchangeably referred to as "user devices." In some contexts, "client devices" may also be referred to as "computing devices."

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

A. Communication System

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some other form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching.

A server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access a separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may comprise millions of client devices, thousands of server devices and/or thousands of server data storages. Furthermore, client devices may take on forms other than those in FIG. 1.

B. Server Device

Figure 2A:
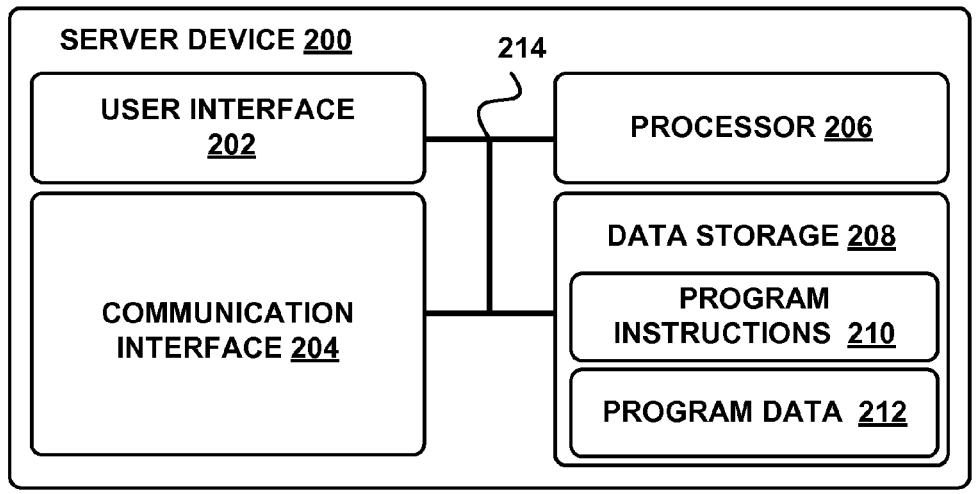
FIG. 2A is a block diagram of a server device, in accordance with an example embodiment.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and data storage 208, all of which may be linked together via a system bus, network, or other connection mechanism 214.

User interface 202 may comprise user input devices such as a keyboard, a keypad, a touch screen, a computer mouse, a track ball, a joystick, and/or other similar devices, now known or later developed. User interface 202 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or a similar transceiver configurable to communicate via a twisted pair wire, a coaxial cable, a fiber-optic link or other physical connection to a wireline device or network.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Thus, data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "cloud-based" computing is to offload processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
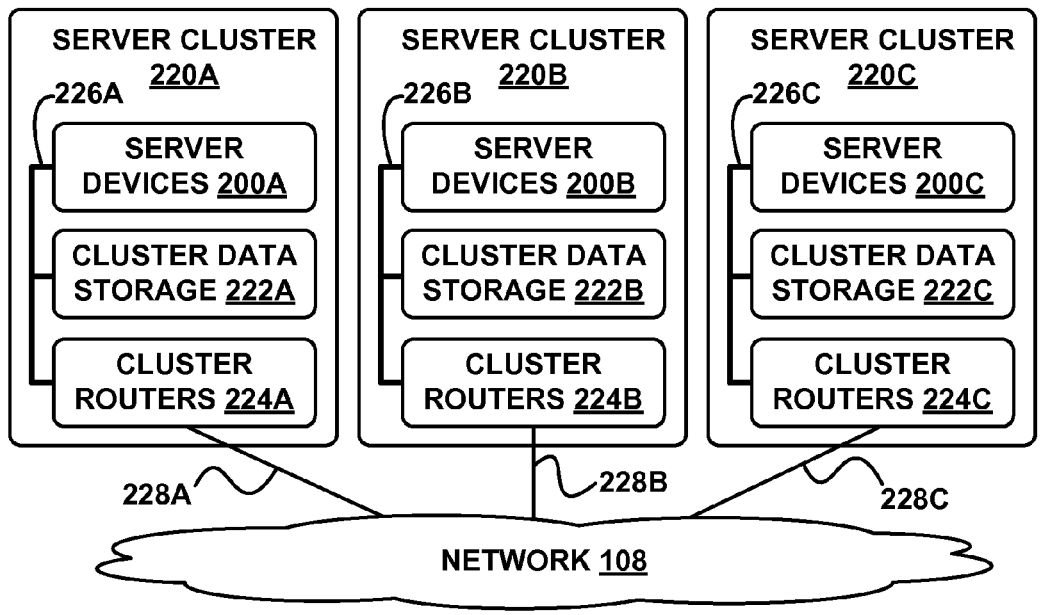
FIG. 2B depicts a cloud-based server system, in accordance with an example embodiment.

FIG. 2B depicts a cloud-based server cluster in accordance with an example embodiment. In FIG. 2B, functions of server device 110 and server data storage device 112 may be distributed among three server clusters 220A, 220B, and 220C. Server cluster 220A may include one or more server devices 200A, cluster data storage 222A, and cluster routers 224A connected by a local cluster network 226A. Similarly, server cluster 220B may include one or more server devices 200B, cluster data storage 222B, and cluster routers 224B connected by a local cluster network 226B. Likewise, server cluster 220C may include one or more server devices 200C, cluster data storage 222C, and cluster routers 224C connected by a local cluster network 226C. Server clusters 220A, 220B, and 220C may communicate with network 108 via communication links 228A, 228B, and 228C, respectively.

In some embodiments, each of the server clusters 220A, 220B, and 220C may have an equal number of server devices, an equal number of cluster data storages, and an equal number of cluster routers. In other embodiments, however, some or all of the server clusters 220A, 220B, and 220C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220A, for example, server devices 200A can be configured to perform various computing tasks of server device 110. In one embodiment, these computing tasks can be distributed among one or more of server devices 200A. Server devices 200B and 200C in server clusters 220B and 220C may be configured the same or similarly to server devices 200A in server cluster 220A. On the other hand, in some embodiments, server devices 200A, 200B, and 200C each may be configured to perform different functions. For example, server devices 200A may be configured to perform one or more functions of server device 110, and server devices 200B and server device 200C may be configured to perform functions of one or more other server devices. Similarly, the functions of server data storage device 112 can be dedicated to a single server cluster, or spread across multiple server clusters.

Cluster data storages 222A, 222B, and 222C of the server clusters 220A, 220B, and 220C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220A, 220B, and 220C, various active portions and/or backup/redundant portions of these components can be distributed across cluster data storages 222A, 222B, and 222C. For example, some cluster data storages 222A, 222B, and 222C may be configured to store backup versions of data stored in other cluster data storages 222A, 222B, and 222C.

Cluster routers 224A, 224B, and 224C in server clusters 220A, 220B, and 220C, respectively, may include networking equipment configured to provide internal and external communications for the server clusters. For example, cluster routers 224A in server cluster 220A may include one or more packet-switching and/or routing devices configured to provide (i) network communications between server devices 200A and cluster data storage 222A via cluster network 226A, and/or (ii) network communications between the server cluster 220A and other devices via communication link 228A to network 108. Cluster routers 224B and 224C may include network equipment similar to cluster routers 224A, and cluster routers 224B and 224C may perform networking functions for server clusters 220B and 220C that cluster routers 224A perform for server cluster 220A.

Additionally, the configuration of cluster routers 224A, 224B, and 224C can be based at least in part on the data communication requirements of the server devices and cluster storage arrays, the data communications capabilities of the network equipment in the cluster routers 224A, 224B, and 224C, the latency and throughput of the local cluster networks 226A, 226B, 226C, the latency, throughput, and cost of the wide area network connections 228A, 228B, and 228C, and/or other factors that may contribute to the cost, speed, fault-tolerance, resiliency, efficiency and/or other design goals of the system architecture.

D. Client Device

Figure 3:
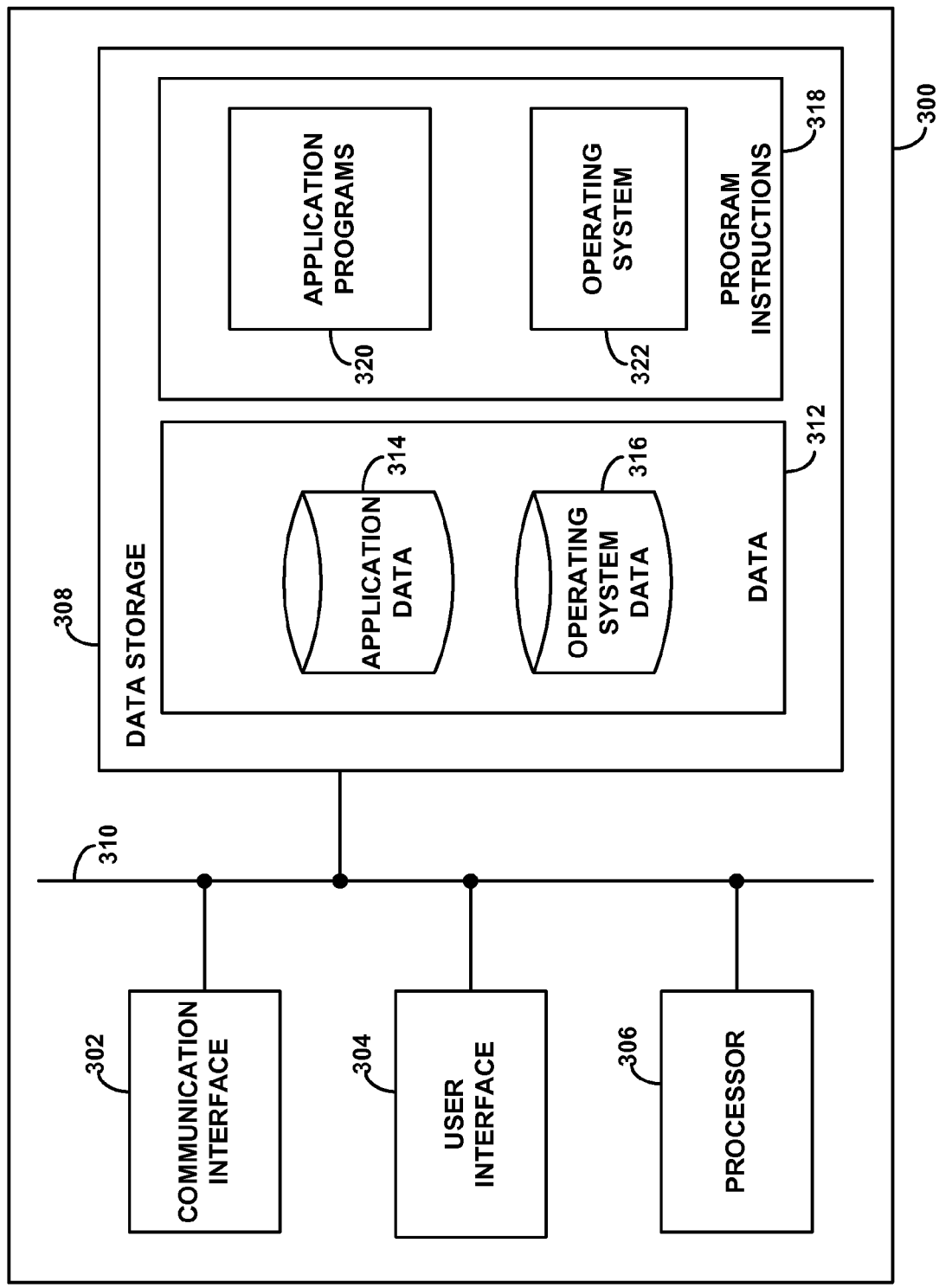
FIG. 3 depicts a block diagram of a client device, in accordance with an example embodiment.

FIG. 3 is a simplified block diagram showing some of the components of an example client device 300. By way of example and without limitation, client device 300 may be a "plain old telephone system" (POTS) telephone, a cellular mobile telephone, a still camera, a video camera, a fax machine, an answering machine, a computer (such as a desktop, notebook, or tablet computer), a personal digital assistant (PDA), a home automation component, a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a presence-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may comprise one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, upon execution by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 322 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

3. Example Automatic Speech Recognition System Overview

Before describing speaker adaptation in detail, it may be beneficial to understand overall ASR system operation. Thus, this section describes ASR systems in general, including how the components of an ASR system may interact with one another in order to facilitate speech recognition, and how some of these components may be trained.

Figure 4:
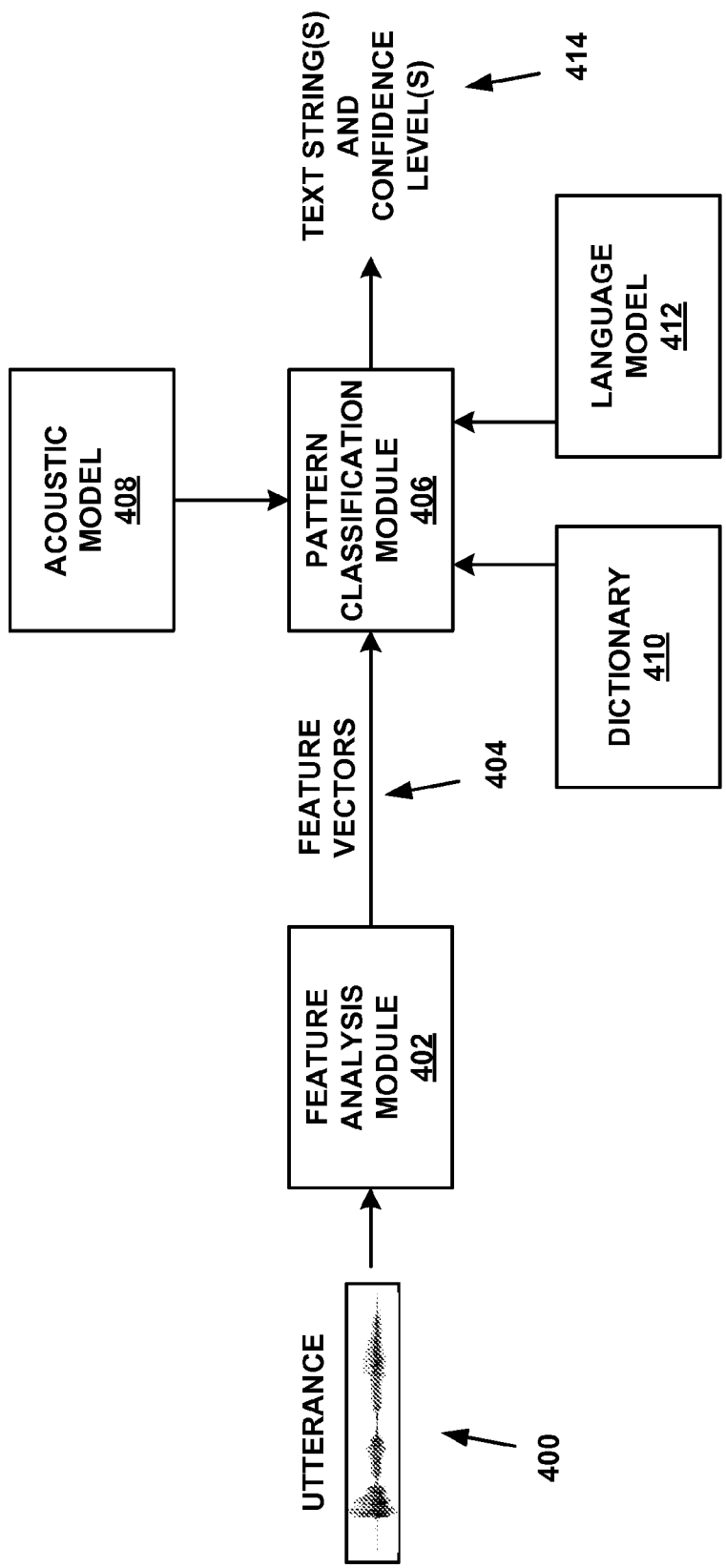
FIG. 4 depicts an ASR system, in accordance with an example embodiment.

FIG. 4 depicts an example ASR system. At run time, the input to the ASR system may include an utterance 400, and the output may include one or more text strings and possibly associated confidence levels 414. The components of the ASR system may include a feature analysis module 402 that produces feature vectors 404, a pattern classification module 406, an acoustic model 408, a dictionary 410, and a language model 412. Pattern classification module 406 may incorporate various aspects of acoustic model 408, dictionary 410, and language model 412.

It should be noted that the discussion in this section, and the accompanying figures, are presented for purposes of example. Other ASR system arrangements, including different components, different relationships between the components, and/or different processing, may be possible.

A. Feature Analysis Module

Feature analysis module 402 may receive utterance 400. This utterance may include an analog or digital representation of human speech, and may possibly contain background noise as well. Feature analysis module 402 may convert utterance 400 to a sequence of one or more feature vectors 404. Each of feature vectors 404 may include temporal and/or spectral representations of the acoustic features of at least a portion of utterance 400. For instance, a feature vector may include mel-frequency cepstrum coefficients of such a portion.

The mel-frequency cepstrum coefficients may represent the short-term power spectrum of a portion of utterance 400. They may be based on, for example, a linear cosine transform of a log power spectrum on a nonlinear mel scale of frequency. (A mel scale may be a scale of pitches subjectively perceived by listeners to be about equally distant from one another, even though the actual frequencies of these pitches are not equally distant from one another.)

To derive these coefficients, feature analysis module 402 may sample and quantize utterance 400, divide it into overlapping or non-overlapping frames of s milliseconds, and perform spectral analysis on the frames to derive the spectral components of each frame. Feature analysis module 402 may further perform noise removal and convert the standard spectral coefficients to mel-frequency cepstrum coefficients, and then calculate first-order and second-order cepstral derivatives of the mel-frequency cepstrum coefficients.

The first-order cepstral coefficient derivatives may be calculated based on the slopes of linear regressions performed over windows of two or more consecutive frames. The second-order cepstral coefficient derivatives may be calculated based on the slopes of linear regressions performed over windows of two or more consecutive sets of first-order cepstral coefficient derivatives. However, there may be other ways of calculating the first-order and second-order cepstral coefficient derivatives.

In some embodiments, one or more frames of utterance 400 may be represented by a feature vector of mel-frequency cepstrum coefficients, first-order cepstral coefficient derivatives, and second-order cepstral coefficient derivatives. For example, the feature vector may contain 13 coefficients, 13 first-order derivatives, and 13 second-order derivatives, therefore having a length of 39. However, feature vectors may use different combinations of features in other possible embodiments.

B. Pattern Classification Module

Pattern classification module 406 may receive a sequence of feature vectors 404 from feature analysis module 402 and produce, as output, one or more text string transcriptions 414 of utterance 400. Each transcription 414 may be accompanied by a respective confidence level indicating an estimated likelihood that the transcription is correct (e.g., 80% confidence, 90% confidence, etc.).

To produce this output, pattern classification module 406 may include, or incorporate aspects of acoustic model 408, dictionary 410, and/or language model 412. In some embodiments, pattern classification module 406 may also use a search graph that represents sequences of word or sub-word acoustic features that appear in spoken utterances. The behavior of pattern classification module 406 will be described below in the context of these modules.

C. Acoustic Model

Acoustic model 408 may determine probabilities that a particular sequence of feature vectors 404 were derived from a particular sequence of spoken words and/or sub-word sounds. This may involve mapping sequences of feature vectors to one or more phonemes, and then mapping sequences of phonemes to one or more words.

A phoneme may be considered to be the smallest segment of an utterance that encompasses a meaningful contrast with other segments of utterances. Thus, a word typically includes one or more phonemes. For purposes of simplicity, phonemes may be thought of as utterances of letters, but this is not a perfect analogy, as some phonemes may present multiple letters. An example phonemic spelling for the American English pronunciation of the word "cat" is /k/ /ae/ /t/, consisting of the phonemes /k/, /ae/, and /t/. Another example phonemic spelling for the word "dog" is /d/ /aw/ /g/, consisting of the phonemes /d/, /aw/, and /g/.

Different phonemic alphabets exist, and these alphabets may have different textual representations for the various phonemes therein. For example, the letter "a" may be represented by the phoneme /ae/ for the sound in "cat," by the phoneme /ey/ for the sound in "ate," and by the phoneme /ah/ for the sound in "beta." Other phonemic representations are possible.

Common phonemic alphabets for American English contain about 40 distinct phonemes. Each of these phonemes may be associated with a different distribution of feature vector values. Thus, acoustic model 408 may be able to estimate the phoneme(s) in a feature vector by comparing the feature vector to the distributions for each of the 40 phonemes, and finding one or more phonemes that are most likely represented by the feature vector.

One way of doing so is through use of a hidden Markov model (HMM). An HMM may model a system as a Markov process with unobserved (i.e., hidden) states. Each HMM state may be represented as a multivariate Gaussian distribution that characterizes the statistical behavior of the state. Additionally, each state may also be associated with one or more state transitions that specify the probability of making a transition from the current state to another state.

When applied to an ASR system, the combination of the multivariate Gaussian distribution and the state transitions for each state may define a time sequence of feature vectors over the duration of one or more phonemes. Alternatively or additionally, the HMM may model the sequences of phonemes that define words. Thus, some HMM-based acoustic models may also consider phoneme context when a mapping a sequence of feature vectors to one or more words.

Figure 5:
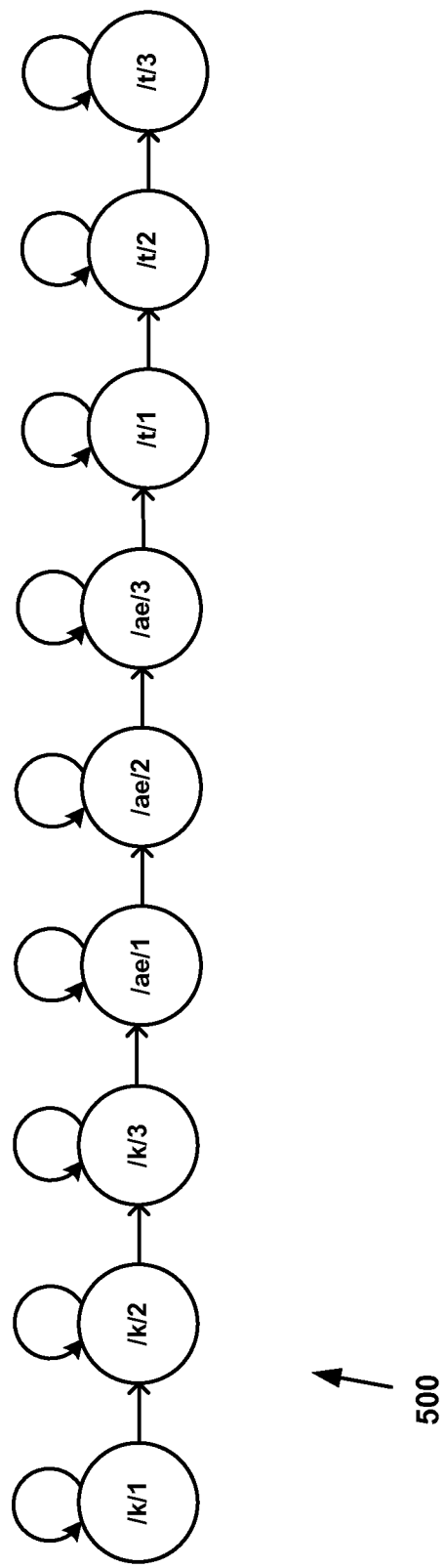
FIG. 5 depicts aspects of an acoustic model, in accordance with an example embodiment.

FIG. 5 depicts an example HMM-based acoustic model 500. Acoustic model 500 defines a sequence of phonemes that make up the word "cat." Thus, each phoneme is represented by a 3-state HMM with an initial state, a middle state, and an end state representing the statistical characteristics at the beginning of phoneme, the middle of the phoneme, and the end of the phoneme, respectively. Each state (e.g., state /k/1, state /k/2, etc.) may represent a phoneme and may include one or more transitions.

Acoustic model 500 may represent a word by concatenating the respective 3-state HMMs for each phoneme in the word together, with appropriate transitions. These concatenations may be performed based on information in dictionary 410, as discussed below. In some implementations, more or fewer states per phoneme may be used in an acoustic model.

An acoustic model may be trained using recordings of each phoneme in numerous contexts (e.g., various words and sentences) so that a representation for each of the phoneme's states can be obtained. These representations may encompass the multivariate Gaussian distributions discussed above.

In order to train the acoustic model, a possibly large number of utterances containing spoken phonemes may each be associated with transcriptions. These utterances may be words, sentences, and so on, and may be obtained from recordings of everyday speech or some other source. The transcriptions may be high-accuracy automatic or manual (human-made) text strings of the utterances.

The utterances may be segmented according to their respective transcriptions. For instance, training of the acoustic models may involve segmenting the spoken strings into units (e.g., using either a Baum-Welch and/or Viterbi alignment method), and then using the segmented utterances to build distributions for each phoneme state.

Consequently, as more data (utterances and their associated transcriptions) are used for training, a more accurate acoustic model is expected to be produced. However, even a well-trained acoustic model may have limited accuracy when used for ASR in a domain for which it was not trained. For instance, if an acoustic model is trained by utterances from a number of speakers of American English, this acoustic model may perform well when used for ASR of American English, but may be less accurate when used for ASR of, e.g., British English.

Also, if an acoustic model is trained using utterances from a number of speakers, it will likely end up representing each phoneme as a statistical average of the pronunciation of this phoneme across all of the speakers. Thus, an acoustic model trained in this fashion may represent the pronunciation and usage of a hypothetical average speaker, rather than any particular speaker.

For purposes of simplicity, throughout this specification and the accompanying drawings, it is assumed that acoustic models represent phonemes as context-dependent phonemic sounds. However, acoustic models that use other types of representations are within the scope of the embodiments herein.

D. Dictionary

TABLE 1

| Word | Phonemic Interpretation |
|------|-------------------------|
| cat  | /k/ /ae/ /t/            |
| and  | /ay/ /n/ /d/            |
| dog  | /d/ /aw/ /g/            |

As noted above, dictionary 410 may define a pre-established mapping between phonemes and words. This mapping may include a list of tens or hundreds of thousands of phoneme-pattern-to-word mappings. Thus, in some embodiments, dictionary 410 may include a lookup table, such as Table 1. Table 1 illustrates how dictionary 410 may list the phonemic sequences that pattern classification module 406 uses for the words that the ASR system is attempting to recognize. Therefore, dictionary 410 may be used when developing the phonemic state representations of words that are illustrated by acoustic model 500.

E. Language Model

Language model 412 may assign probabilities to sequences of phonemes or words, based on the likelihood of that sequence of phonemes or words occurring in an input utterance to the ASR system. Thus, for example, language model 412 may define the conditional probability of $w_n$ (the nth word in a phrase transcribed from an utterance), given the values of the pattern of n−1 previous words in the phrase. More formally, language model 412 may define $$P(w_n | w_1, w_2, \ldots, w_{n-1})$$

In general, a language model may operate on n-grams, which, for example, may be sequences of n phonemes or words that are represented in pattern classification module 406. In practice, language models with values of n greater than 5 are rarely used because of their computational complexity, and also because smaller n-grams (e.g., 3-grams, which are also referred to as tri-grams) tend to yield acceptable results. In the example described below, tri-grams are used for purposes of illustration. Nonetheless, any value of n may be may be used with the embodiments herein.

Language models may be trained through analysis of a corpus of text strings. This corpus may contain a large number of words, e.g., hundreds, thousands, millions or more. These words may be derived from utterances spoken by users of an ASR system and/or from written documents. For instance, a language model can be based on the word patterns occurring in human speech, written text (e.g., emails, web pages, reports, academic papers, word processing documents, etc.), and so on.

From such a corpus, tri-gram probabilities can be estimated based on their respective number of appearances in the training corpus. In other words, if $C(w_1, w_2, w_3)$ is the number of occurrences of the word pattern $w_1, w_2, w_3$ in the corpus, then $$P(w_3 | w_1, w_2) \approx \frac{C(w_1, w_2, w_3)}{C(w_1, w_2)}$$

Thus, a language model may be represented as a table of conditional probabilities. Table 2 illustrates a simple example of such a table that could form the basis of language model 406. Particularly, Table 2 contains tri-gram conditional probabilities.

TABLE 2

| Tri-gram Conditional Probabilities |
|------------------------------------|
| P(dog\|cat,and) = 0.50 |
| P(mouse\|cat,and) = 0.35 |
| P(bird\|cat,and) = 0.14 |
| P(fiddle\|cat,and) = 0.01 |

For the 2-gram prefix "cat and," Table 2 indicates that, based on the observed occurrences in the corpus, 50% of the time the next 1-gram is "dog." Likewise, 35% of the time, the next 1-gram is "mouse," 14% of the time the next 1-gram is "bird," and 1% of the time the next 1-gram is "fiddle." Clearly, in a fully-trained ASR system, the language model would contain many more entries, and these entries would include more than just one 2-gram prefix.

Nonetheless, using the observed frequencies of word patterns from a corpus of speech (and/or from other sources) is not perfect, as some acceptable tri-grams may not appear in the corpus, and may therefore be assigned a probability of zero. Consequently, when given a zero-probability tri-gram at run time, the language model may attempt to find another n-gram associated with a non-zero probability.

In order to address this issue, the language model may be smoothed so that zero-probability tri-grams have small non-zero probabilities, and the probabilities of the tri-grams in the corpus are reduced accordingly. In this way, tri-grams not found in the corpus can still be recognized by the language model. Alternatively, the language model may back off when encountering a zero-probability tri-gram, and consider a related non-zero-probability bi-gram or uni-gram instead.

4. Example Automatic Speech Recognition System Operation

Once acoustic model 408 and language model 412 are appropriately trained, feature analysis model 402 and pattern classification module 406 may be used to perform ASR. Provided with an input utterance, the ASR system can search the space of valid word sequences from the language model to find the word sequence with the maximum likelihood of having been spoken in the utterance. A challenge with doing so is that the size of the search graph can be quite large, and therefore performing this search may take an excessive amount of computing resources (e.g., processing time and memory utilization). Nonetheless, there are some heuristic techniques that can be used to reduce the complexity of the search, potentially by one or more orders of magnitude.

For instance, a finite state transducer (FST) can be used to compactly represent multiple phoneme patterns that map to a single word. Some words, such as "data," "either," "tomato," and "potato," have multiple pronunciations. The phoneme sequences for these pronunciations can be represented in a single FST per word.

This process of creating efficient phoneme-level FSTs can be carried out for words in dictionary 410, and the resulting word FSTs can be combined into sentence FSTs using the language model 412. Ultimately, a very large network of states for phonemes, words, and sequences of words can be developed and represented in a compact search graph.

Figure 6:
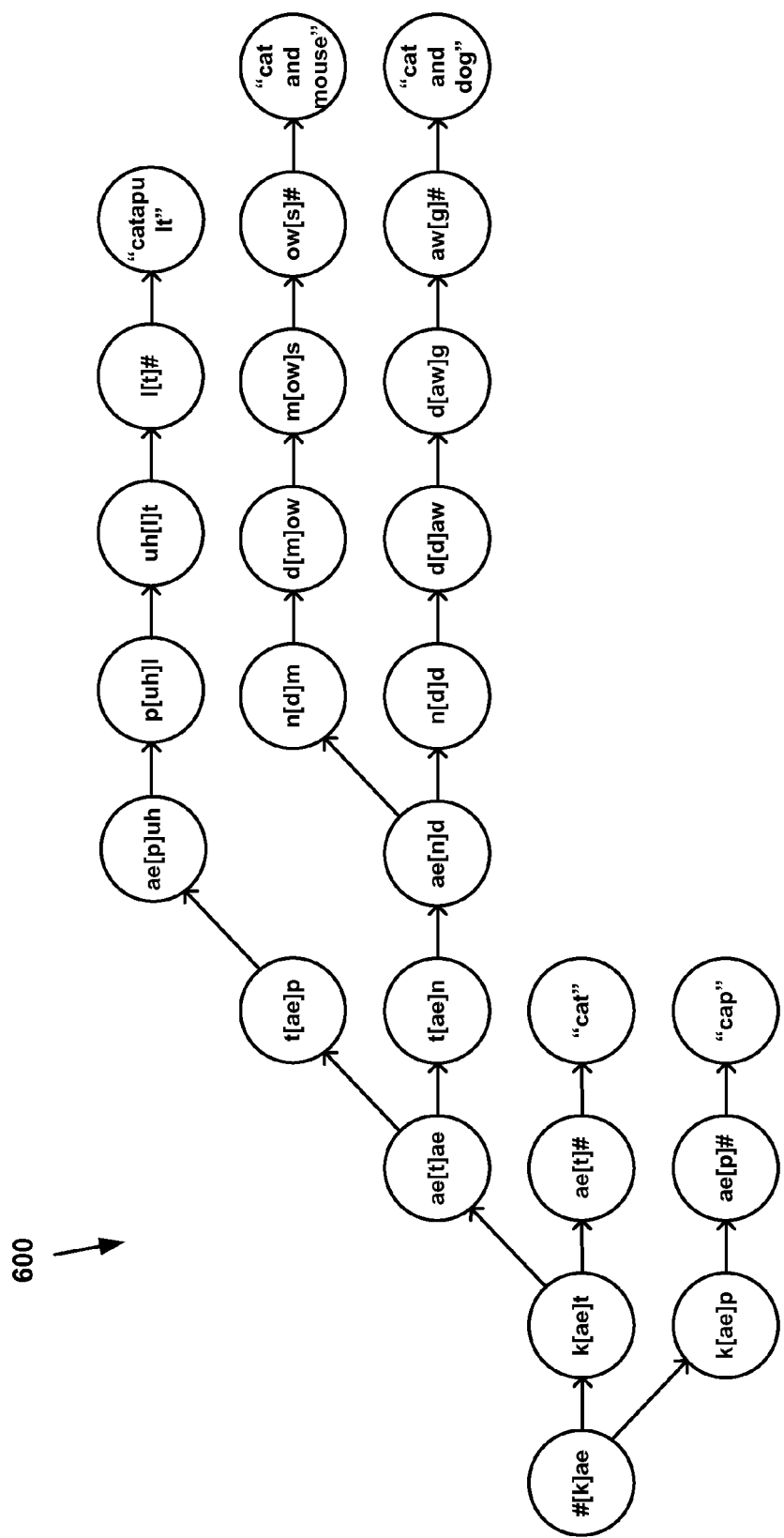
FIG. 6 depicts an ASR system search graph, in accordance with an example embodiment.

FIG. 6 contains an example search graph 600. In order to be illustrative, search graph 600 is much smaller and less complex than a search graph that would be used in an actual ASR system. Particularly, search graph 600 was trained with only the five input utterances, "catapult," "cat and mouse," "cat and dog," "cat," and "cap."

Each circle in search graph 600 may represent a state associated with the processing of an input utterance that has been mapped to phonemes. For purposes of simplicity, each phoneme in search graph 600 is represented with a single state rather than multiple states. Also, self-transitions are omitted from search graph 600 in order to streamline FIG. 6.

The states in search graph 600 are named based on the current phoneme context of the input utterance, using the format "x[y]z" to indicate that the current phoneme being considered, y, has a left-context of the phoneme x and a right context of the phoneme z. In other words, the state "x[y]z" indicates a point in processing an utterance in which the current phoneme being considered is y, the previously phoneme in the utterance is x, and the next phoneme in the utterance is z. The beginning of an utterance and the end of an utterance are represented by the "#" character, and also may be referred to as null phonemes.

Terminal states may be represented by a recognized word or phrase in quotes. Search graph 600 includes five terminal states, representing recognition of the words or phrases "catapult," "cat and mouse," "cat and dog," "cat," and "cap."

Transitions from one state to another may represent an observed ordering of phonemes in the corpus. For instance, the state "#[k]ae" represents the recognition of a "k" phoneme with a left context of a null phoneme and a right context of an "ae" phoneme. There are two transitions from the state "#[k]ae"—one for which the next phoneme (the phoneme after the "ae") is a "t" and another for which the next phoneme is a "p."

Based on acoustic model 408, dictionary 410, and language model 412, costs may be assigned to one or more of the states and/or transitions. For example, if a particular phoneme pattern is rare, a transition to a state representing that phoneme pattern may have a higher cost than a transition to a state representing a more common phoneme pattern. Similarly, the conditional probabilities from the language model (see Table 2 for examples) may also be used to assign costs to states and/or transitions. For instance, in Table 2, given a phrase with the words "cat and," the conditional probability of the next word in the phrase being "dog" is 0.5, while the conditional probability of the next word in the phrase being "mouse" is 0.35. Therefore, the transition from state "ae[n]d" to state "n[d]m" may have a higher cost than the transition from state "ae[n]d" to state "n[d]d."

Search graph 600, including any states, transitions between states, and associated costs therein, may be used to estimate text string transcriptions for new input utterances. For example, pattern classification module 406 may determine a sequence of one or more words that match an input utterance based on search graph 600. Formally, pattern classification module 406 may attempt to find $$w^* = \text{argmax}_w P(a|w)P(w)$$

where a is a stream of feature vectors derived from the input utterance, P(a|w) represents the probability of those feature vectors being produced by a word sequence w, and P(w) is the probability assigned to w by language model 412. For example, P(w) may be based on n-gram conditional probabilities as discussed above, as well as other factors. The function argmax$_w$ may return the value of w that maximizes P(a|w)P(w).

To find text strings that may match utterance, pattern classification module 406 may attempt to find paths from an initial state in search graph 600 to a terminal state in search graph 600 based on feature vectors 404. This process may involve pattern classification module 406 performing a breadth-first search, depth-first search, beam search, or some other type of search on search graph 600. Pattern classification module 406 may assign a total cost to one or more paths through search graph 600 based on costs associated with the states and/or transitions of associated with each path. Some of these costs may be based on, for instance, a confidence level that a particular segment of the utterance maps to a particular sequence of phonemes in the path.

As an example, suppose that utterance 400 is the phrase "cat and dog." In a possible scenario, pattern classification module 406 would step through search graph 600 phoneme by phoneme to find the path beginning with initial state "#[k] ae" and ending with terminal state "cat and dog." Pattern classification module 406 may also find one or more additional paths through search graph 600. For example, pattern classification module 406 may also associate utterance 400 with the path with initial state "#[k]ae" and ending with terminal state "cat and mouse," and with the path with initial state "#[k]ae" and ending with terminal state "catapult." Nonetheless, pattern classification module 406 may assign a lower cost to the path with terminal state "cat and dog" than to other paths. Consequently, the path with terminal state "cat and dog" may be selected as the "best" transcription for the input utterance.

It should be understood that ASR systems can operate in many different ways. The embodiments described above are presented for purposes of illustration and may not be the only way in which an ASR system operates.

5. Examples of Finite State Transducer Representations of Search Graphs

As noted above, FSTs may be used to represent both dictionary 410 and language model 412. Particularly, weighted FSTs (WFSTs) can be used to represent transitions and their associated costs (e.g., probabilities) between states. For sake of simplicity, the term "FST" will be used herein to refer to both FSTs and WFSTs.

Formally, an FST can be represented as a type of finite-state machine, and may include a start state and one or more final (e.g., terminal) states. Each final state may be associated with a weight. A transition between two states may be associated with an input label, an output label, and a weight. Each input label and each output label may consist of one or more symbols.

A path from the start state to the final state includes a sequence of transitions that represents a sequential mapping from the input label symbols on the transitions of the path to the output label symbols on these transitions. For any particular transition, an input label and/or an output label may be the empty symbol, E, which indicates that no symbol is consumed and/or produced, respectively, for the particular transition. The weight of a path may be calculated as the sum (or product) of the weights on each transition in the path, plus the weight associated with the final state (if a final state has a weight of 0, this weight may be omitted from the FST). By following a path of an FST, an input symbol sequence can be mapped to an output symbol sequence, and the weight of the path may be associated with the mapping.

In some embodiments, the search graph may include one or more distinct super-final states. Super-final states may be included for computational convenience, and may include one or more incoming transitions with input and output symbols of $\epsilon$, and the weight of an associated final state. Super-final states will be discussed in more detail below.

Example FSTs are given in FIGS. 7A and 7B. By convention, the initial state has a bold circle and a final state has a double circle. Also, a transition is annotated with the term i:o/w, indicating that input symbol i maps to output symbol o with weight w. Each weight may represent a probability, a logarithm of a probability, a cost, etc.

In FIG. 7A, FST 700 includes states A0, A1, A2, and A3. Transition 702, from state A0 to A1, is labeled with input symbol a, output symbol b, and weight 0.1. Thus, transition 702 represents a mapping from symbols a to b, associated with a weight of 0.1. Similarly, transition 704 represents a mapping from symbols b to a, associated with a weight of 0.2. State A1 has a self-transition, transition 706, which maps zero or more instances of symbol c to the same number of instances of symbol a, each mapping associated with a weight of 0.3.

When considered as a whole, FST 700 maps the input symbol string $ac^xa$ to the output symbol string $ba^xa$, where $x \geq 0$, and the notation $s^x$ represent x instances of the symbol s. Assuming that path weights are additive, the weight of this mapping is 1.1, 1.4, 1.7, etc., depending on the value of x (e.g., the number of c's in the input symbol string). FST 700 also maps the input symbol string bb to the output symbol string ab, with a weight of 1.3.

In FIG. 7B, FST 710 maps the input symbol string bad' to the output symbol string $cbb^x$ with weights of 1.4, 2.0, 2.6, etc., based on the value of x (again, additive path weights are assumed). It should be understood that FST 700 and FST 710 are merely simple examples of FSTs. Actual FSTs used in ASR systems may be much larger and more complex.

Figure 8A:
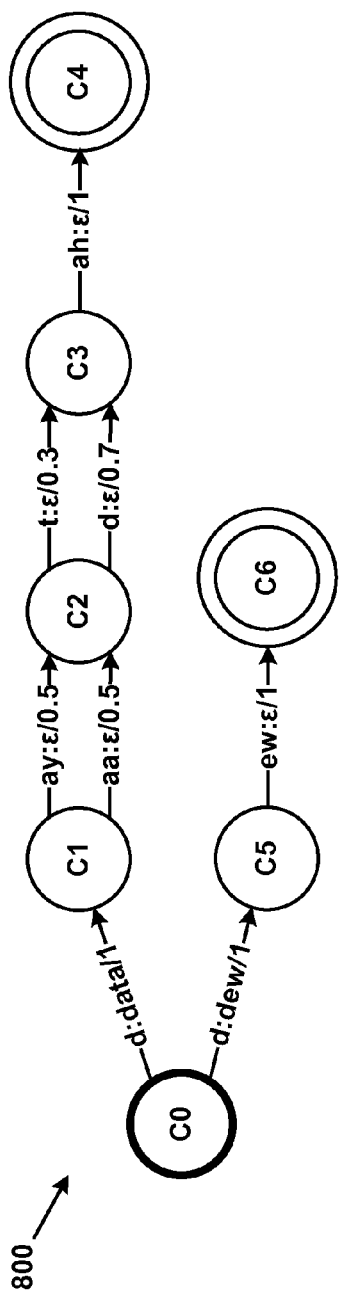
FIGS. 8A and 8B also depict FSTs, in accordance with example embodiments.
Figure 8B:
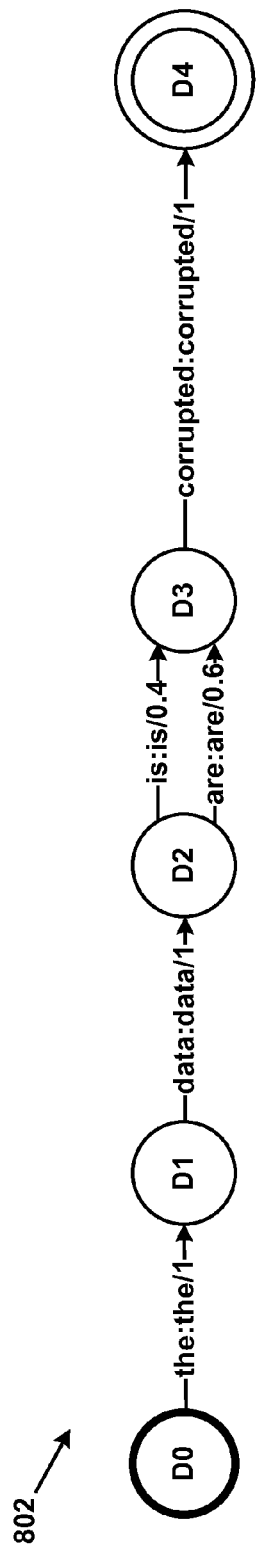

FIGS. 8A and 8B provide simple examples of dictionary and language model FSTs, respectively. FIG. 8A depicts FST 800, which represents a simple dictionary mapping from phonemes to words with probabilities representing the likelihoods of alternative pronunciations. The string of phonemes can be read as a path from the start state to a final state, the path associated with a word string with a particular weight. The word corresponding to a pronunciation is output by the transition that consumes the first phone for that pronunciation. The transitions that consume the remaining phonemes output no further symbols, indicated by the empty symbol, E, as those transitions' output label.

As an example, FST 800 in FIG. 8A maps the phoneme strings "/d/ /ay/ /t/ /ah/," "/d/ /aa/ /t/ /ah/," "/d/ /ay/ /d/ /ah/," and "/d/ /aa/ /d/ /ah/" to the text string "data". FST 800 also maps the phoneme string "/d/ /ew/" to the text string "dew". In this case, unlike FST 700 and 710, the weight associated with each transition is a probability, and the path weight may be calculated as the product of the weights of each transition in the path. For instance, FST 800 indicates that the text string "data" is pronounced as "/d/ /ay/ /t/ /ah/" 15% of the time, "/d/ /aa/ /t/ /ah/" 15% of the time, "/d/ /ay/ /d/ /ah/" 35% of the time, and "/d/ /aa/ /d/ /ah/" 35% of the time. On the other hand, there is only one pronunciation of "dew" that is supported.

One way of understanding FST 800 is that it transduces a phoneme sequence to a word with a particular weight. The word corresponding to a pronunciation is output by the transition that consumes the first phoneme for that pronunciation. The transitions that consume the remaining phoneme do not output any symbols, as indicated by empty symbol, $\epsilon$, as the transition's output label. Since words can be demarked by output symbol, it may be possible to combine the FSTs for more than one word without losing track of where each word begins and ends. Another advantage of FSTs, as can be seen from FIG. 8A, is that a large ASR dictionary can be represented in a relatively compact amount of space.

Additionally, as shown in FIG. 8B, FSTs can also represent language models. FST 802 represents a grammar fragment that includes the text strings "the data is corrupted" and "the data are corrupted", with associated probabilities of 0.4 and 0.6, respectively.

Although not shown in FIGS. 8A and 8B, both FST 800 and FST 802 may include weights associated with one or more of their final states. Also, it should be clear that FSTs used in ASR systems may be far larger and more complex, for example including thousands, millions, or billions of states. The FST examples shown herein are for purposes of illustration, and therefore have been simplified.

An additional possible benefit of FSTs is that two or more FSTs can be combined through a process referred to as "composition." Composition allows, for instance, the dictionary represented by FST 800 to be combined with the grammar represented by FST 802. The resulting search graph may represent the grammar of FST 802, including the several ways of pronouncing "data" as represented by FST 800.

It should be noted that, strictly speaking, the composition of FST 800 with FST 802 may result in an empty FST, because FST 800 does not have paths for "The", "is", "are", and "corrupted". Additionally, FST 800 may require a transition from the final state back to the initial state in order to have paths corresponding to the sequence of words in FST 802. However, for sake of illustration and simplicity, FST 800 represents just one word.

In general, a grammar that contains m words may be composed with one or more dictionary FSTs that represent one or more ways of pronouncing each of the m words. Clearly, such a composition of FSTs, even for a small grammar with few words, can be difficult to visualize.

Figure 9:
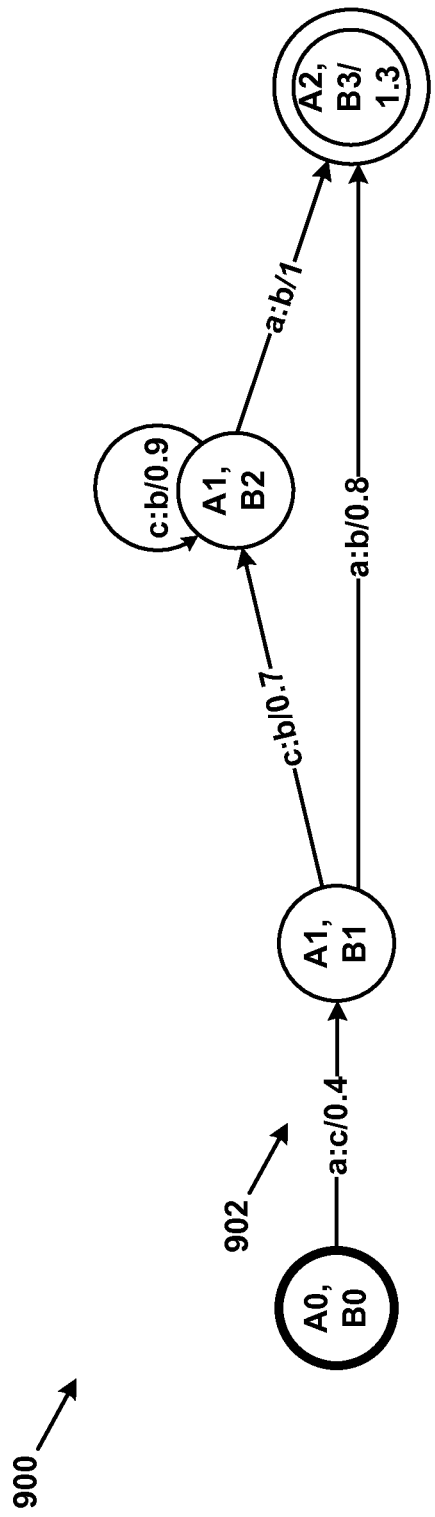
FIG. 9 depicts another FST, in accordance with an example embodiment.

In order to illustrate composition using simpler FSTs, FIG. 9 represents the composition of FSTs 700 and 710. FST 900 maps sequences of symbols that would be valid input for FST 700 to sequences of symbols that would be valid output for FST 700 and would be valid input for FST 710. Then, FST 900 maps this result to sequences of symbols that valid output for FST 710. In other words, the composition of two FSTs, $T_1$ and $T_2$, (denoted $T_1 \circ T_2$) may be thought of as using the input symbols of FST $T_1$ and the output symbols of FST $T_2$.

Formally, $T_1 \circ T_2$ has exactly one path mapping string u to string w for each pair of paths, the first in $T_1$ mapping u to some string v and the second in $T_2$ mapping v to w. The weight of a path in $T_1 \circ T_2$ may be computed from the weights of the two corresponding paths in $T_1$ and $T_2$ with the same operation that computes the weight of a path from the weights of its transitions. If the transition weights represent probabilities, that operation may be multiplication. If instead the weights represent log probabilities or negative log probabilities the operation may be addition.

In FST 900, each state represents the composition of two states, one from each of FST 700 and FST 710. Thus, for instance, state A0, B0 is the composition of state A0 from FST 700 and state B0 from FST 710. Each transition is also a composition of transitions from FST 700 and FST 710. Thus, each transition includes an input symbol from a state of FST 700 and an output symbol from FST 710, such that the input symbol is mapped to an intermediate symbol by FST 700 and that intermediate symbol, when used as the input symbol in an associated state of FST 710, produces the output symbol.

Thus, for transition 902, which is the composition of transition 702 from FST 700 and transition 712 of FST 710, the input symbol a is also the input symbol for transition 702. Transition 702 maps this input symbol a to the output symbol b, which is the intermediate symbol for transition 902. (By convention, intermediate symbols do appear in composed FSTs.) Transition 712 takes the intermediate symbol b as an input symbol, and maps it to output symbol c. Therefore, transition 902 maps input symbol a to output symbol c.

Additionally, transition 702 is associated with a weight of 0.1 and transition 712 is associated with a weight of 0.3. Assuming these weights represent negative log probabilities, the weight associated with transition 902 is 0.4, the sum of these two weights. Similar logic applies to the other transitions and states in FST 900.

6. Example Maximum a Posteriori and Minimum Bayes Risk Techniques for Selecting a Transcription Given the components of an ASR system, such as those described above, one method of selecting a transcription of an utterance is to use a maximum a posteriori (MAP) technique. Formally, given an utterance x, MAP techniques attempt to find a transcription y that maximizes $P(y|x)$, which is the probability that the transcription is correct given the utterance. It should be noted that when describing MAP and MBR techniques herein, a slightly different notation is used than introduced in Section 4.

Bayes' formula provides that $$P(y \mid x) = \frac{P(y)P(x \mid y)}{P(x)}$$

Therefore, the transcription that maximizes $P(y)P(x|y)$ also maximizes $P(y|x)$. While the values of $P(y)$ and $P(x|y)$ may not be known, they can be approximated.

For example, $P(y)$, the probability of transcription y, can be estimated from a language model. This estimation may be based on the observation that some sequences of words are more likely to appear in a given language than others. For instance, the sentence, "this sentence is normal" will have a relatively high probability in the language model, because the sequence of words follows English grammar rules. However, the sentence "colorless green ideas sleep furiously" will have a relatively low probability in the language model, because each word is unexpected given the previously-observed words.

$P(x|y)$, the probability of utterance x given transcription y, can be determined by an acoustic model. Doing so may involve the use of pronunciation dictionaries to map the word to sequences of phonemes, each associated with a probability.

It should be noted that the MAP technique may select a transcription that minimizes the likelihood of transcription-level error. This transcription will be called $y_{best}$. For example, if $y_{best}$ is a sentence, the MAP technique minimizes the probability of $y_{best}$ having at least one word error.

However, a potentially more useful metric of ASR performance is word error rate (WER). The WER between a particular transcription and the correct transcription, y*, may be defined as the number of edits (substitutions, deletions or insertions) needed to change the particular transcription into y*, divided by the number of words in y*. This number of edits may also be referred to as the Levenshtein edit distance.

Minimizing WER, rather than transcription-level error, is motivated by the observation that some transcription-level errors matter more than others. For example, the best transcription as given by the MAP technique may have more word errors when compared to a correct transcription of the utterance than other possible transcriptions with lower probabilities than $y_{best}$. Put another way, WER gives partial credit for correctly recognizing portions of sentences.

Minimum Bayesian Risk (MBR) techniques can also be used to select a transcription. One possible advantage of using MBR techniques is that they can be tuned to select a transcription that is optimal with respect to a general loss function, L. It is assumed that the loss function generates a cost when the system erroneously produces a transcription y instead of y*. If this loss function is the Levenshtein edit distance, then the MBR technique selects a transcription that is optimal with respect to WER.

Formally, the expected WER for transcription y is $$e(y) = \sum_z P(z \mid x) L(y, z)$$

And the transcription selected by the MBR technique, $y_{MBR}$, is $$y_{MBR} = \mathrm{argmin}_y e(y)$$

In other words, the selected transcription exhibits the lowest expected WER of all transcripts considered.

Nonetheless, the computation of $y_{MBR}$ is expensive compared to using the MAP technique. For instance, a sum of weighted probabilities over the entire language is calculated. Also, each pair of transcriptions is compared and the loss function between them is determined. When the loss function is the Levenshtein edit distance, the running time of L (y,z) is $O(|y||z|)$.

One way of improving the running time of the MBR technique is to limit the search graph. Accordingly, the evidence space, $W_e$, is defined to be the part of the language over which the weighted probabilities are calculated. Additionally, the hypothesis space, $W_h$, is the subset of the search graph (e.g., the language) from which $y_{MBR}$ is chosen.

Therefore, the search graph is limited as follows.

$$e(y) = \sum_{z \in W_e} P(z|x) L(y, z)$$

$$y_{MBR} = \mathrm{argmin}_{y \in W_h} e(y)$$

One way of limiting the hypothesis space is to restrict $W_h$ to an n-best list. In other words, y is selected from the n best transcriptions of the utterance. The n-best list may be determined by evaluating the transcriptions based on one or more metrics such as highest-probability, highest confidence, lowest cost, etc. In some embodiments, the n-best list may be obtained using a MAP technique.

The evidence space may be limited by restricting $W_e$ to sample paths in the search graph. Recall that the search graph can be interpreted as a probability distribution over transcripts. Thus, this probability distribution can be sampled by the following procedure:

1) Push the weights along the edges of the graph toward the initial state (this operation will be described in more detail below).
2) Start at the initial state of the search graph.
3) Select an outgoing edge from the current state based with a probability based on the weight of that edge. In other words, the higher the probability of the outgoing edge, the more likely it is to be selected. In the cases where the weights are, e.g., log probabilities, the lower the weight the more likely it is to be selected.
4) Repeat step 2 until a terminal state is reached at which the search ends.

Then the MBR calculation can be performed. This calculation may involve, for each hypothesis path, considering all evidence paths, computing the sum of the weights on these paths, and returning the best hypothesis path.

The following subsections describe, in more detail, variations and operations that may be involved in embodiments of this procedure.

A. Semirings

Some of the operations discussed herein involve the use of mathematical constructs known as semirings. Formally, a semiring R has two binary operators, $\oplus$ and $\otimes$ called addition and multiplication, respectively. The properties of a semiring are that $\oplus$ is commutative and has identity value $\overline{0}$, $\otimes$ is associative and has identity value $\overline{1}$, $\otimes$ distributes over $\oplus$, and both $\otimes$ of x by $\overline{0}$ and $\otimes$ of $\overline{0}$ by x are $\overline{0}$.

There are several types of semirings, each with potentially different characteristics. For instance, in the probability semiring, R is the set of real numbers, $\oplus$ is normal addition, and $\otimes$ is normal multiplication.

The log semiring is a transform of the probability semiring, in which each value of x in the probability semiring takes on a value of $-\log(x)$ in the log semiring. The $\otimes$ operator denotes normal addition and the $\oplus$ operator is defined such that $x \oplus y = -\log(e^{-x} + e^{-y})$. Although it is mathematically equivalent to the probability semiring, the log semiring may be preferred because it can provide computational efficiency and numerical stability.

The tropical semiring is the same as the log semiring except that $x \oplus y$ is approximated as $\min(x,y)$. This result may be used for computational efficiency, and is based on the Viterbi approximation:

$$-\log(e^{-x} + e^{-y}) \approx -\max(-x,-y) = \min(x,y)$$

Additionally, the signed log semiring operates over the set of tuples that have either 1 or -1 as the first element and a real number as the second element, and is defined by the following relationships:

$(s_1, f_1) \oplus (s_2, f_2) = (s_1, -\log(e^{-f_1} + s_1 s_2 e^{-f_2}))$ if $f_1 \leq f_2$ $(s_1, f_1) \oplus (s_2, f_2) = (s_2, -\log(e^{-f_2} + s_1 s_2 e^{-f_1}))$ if $f_1 > f_2$ $(s_1, f_1) \otimes (s_2, f_2) = (s_1 s_2, f_1 + f_2)$ $\overline{0} = (1, +\infty)$ $\overline{1} = (1, 0)$ B. Pushing Weights As noted above, the search graph may be prepared by pushing the weights associated with some transitions toward the initial state such that the total weight of each path is unchanged. In some embodiments, this operation provides that for every state, the sum of all outgoing edges (including the final weight, which can be seen as an E-transition to a super-final state) is equal to 1.

Figure 10A:
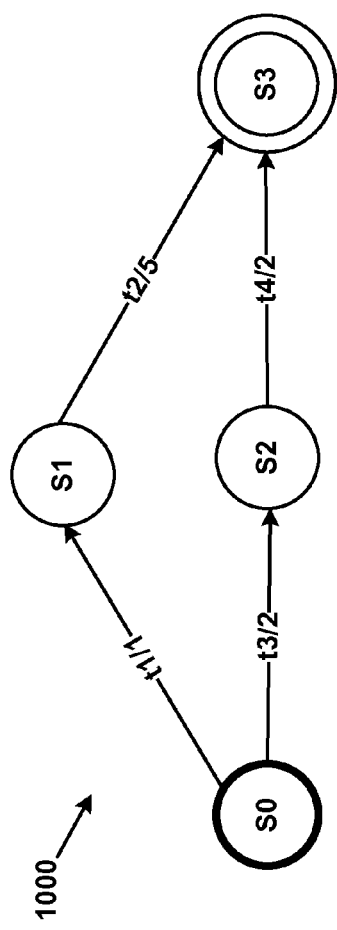
FIGS. 10A and 10B depict additional FSTs, in accordance with example embodiments.

FIG. 10A is an example FST 1000. For sake of convenience, it includes only four states, S0, S1, S2, and S3, as well as four transitions, T1, T2, T3, and T4. Each transition is also labeled with a weight. A weight-pushing algorithm can be applied to FST 1000 to push the weights of transitions closer to initial state S0.

Formally, let d(x) be the sum of weights of all transitions between state x and a final state, per the appropriate semiring. Thus, d(S0)=10, d(S1)=5, d(S2)=2, and d (S3)=0. Also, let w(y) be the weight of transition y. Thus, w(t1)=1, w(t2)=5, w(t3)=2, and w(t4)=2. Further, let p (y) be the state at which transition y begins and let q (y) be the state at which transition y ends. The weight-pushing algorithm re-weights each transition according to the equation $$w'(y) = \frac{w(y) + d(q(y))}{d(p(y))}$$

Figure 10B:
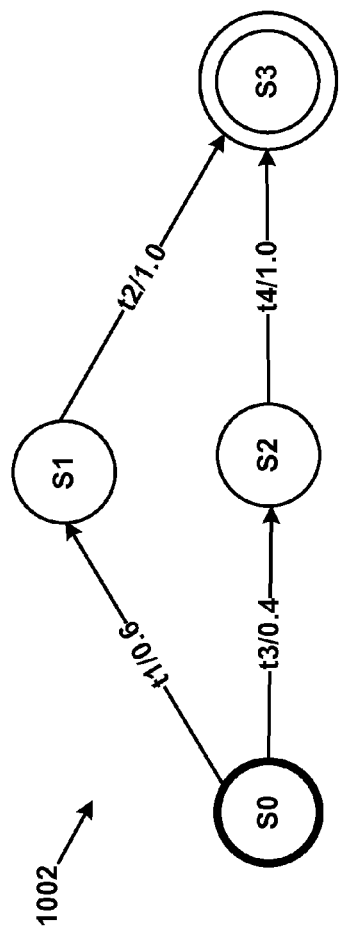

Applying this algorithm to FST 1000, w'(t1)=6/10, w'(t2)=1, w'(t3)=4/10, and w'(t4)=1. The result is shown as FST 1002 in FIG. 10B. Essentially, the weight of transition t2 is pushed to transition t1 and the weight of transition t4 is pushed to transition t2, and the weights are normalized into probabilities. For sake of illustration and convenience, in this example, FST 1002 is converted from being in the log semiring to the probability semiring.

If this pushing is not performed, the sampling algorithm above would start at state S0 and prefer the transition with the highest weight, t3. This would result in the path traversing S0, S2, and S3 being taken. However, the path traversing S0, S1, and S3 has a higher weight and therefore should be preferable over the path traversing S0, S2, and S3. The weight pushing algorithm addresses this issue. Further, in FST 1002, the weights of the outgoing transitions from each state sum to 1, which implies that from each state paths can be sampled according to their respective probabilities.

C. Edit Transducer Factorization in the Tropical Semiring

The MBR technique given above computes the Levenshtein distance between every pair of hypothesis and evidence paths. It may be possible to make this technique more efficient by factoring out the common steps of the computation, and performing these common steps fewer times (e.g., perhaps just once). Doing so may lead to a performance gain, because even different hypothesis and evidence paths can be similar to one another.

FSTs can also be used to efficiently calculate edit distances. For instance, a set of text strings represented as unweighted transducers can be composed with an edit transducer that calculates the edit distance between strings. More formally, for any two strings s1 and s2, assume that their respective FST representations are S1 and S2. Then, let T be an edit transducer such that S1∘T∘S2 is a transducer where all paths have s1 as an input label and s2 as an output label, and where the shortest path has weight L(s1,s2).

Figure 11A:
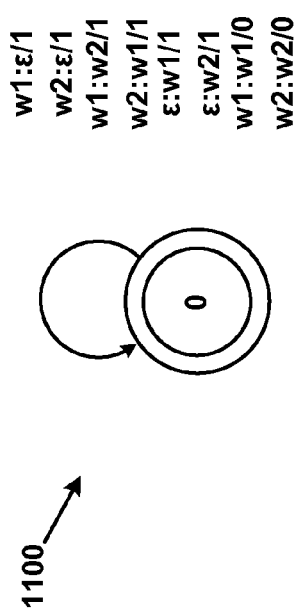
FIGS. 11A, 11B, 11C, and 11D depict edit transducers, in accordance with example embodiments.

An example edit transducer, T, for the words w1 and w2 is depicted in FIG. 11A. All transitions in T are self-transitions and, for sake of convenience and clarity, are provided to the right of T. Each of these transitions may represent an edit distance between the input and output symbols. Thus, transducing w1 to w1 and w2 to w2 have an edit distance of 0, indicating that no edits are required. On the other hand, all other transitions represent an insertion, substitution or deletion, and therefore have an edit distance of 1. Therefore, given two sentences s1 and s2 taken from the dictionary consisting of w1 and w2, and given S1 and S2 (the FST representations of s1 and s2, respectively), the weight of the shortest path of S1∘T∘S2 is the Levenshtein edit distance between s1 and s2.

Figure 11B:
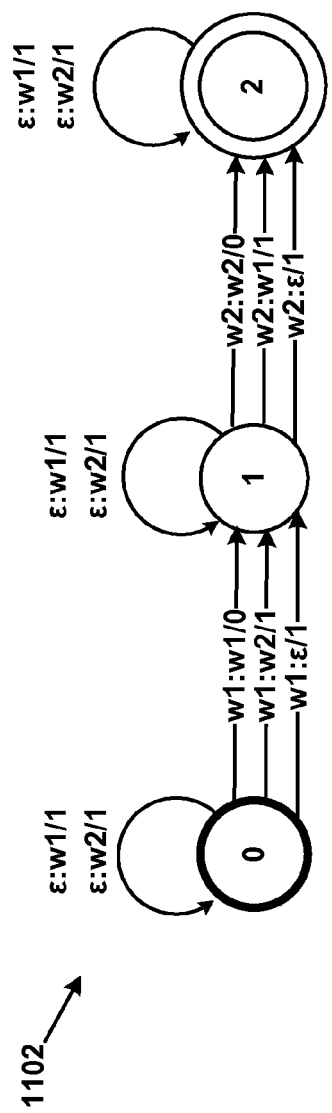
Figure 11C:
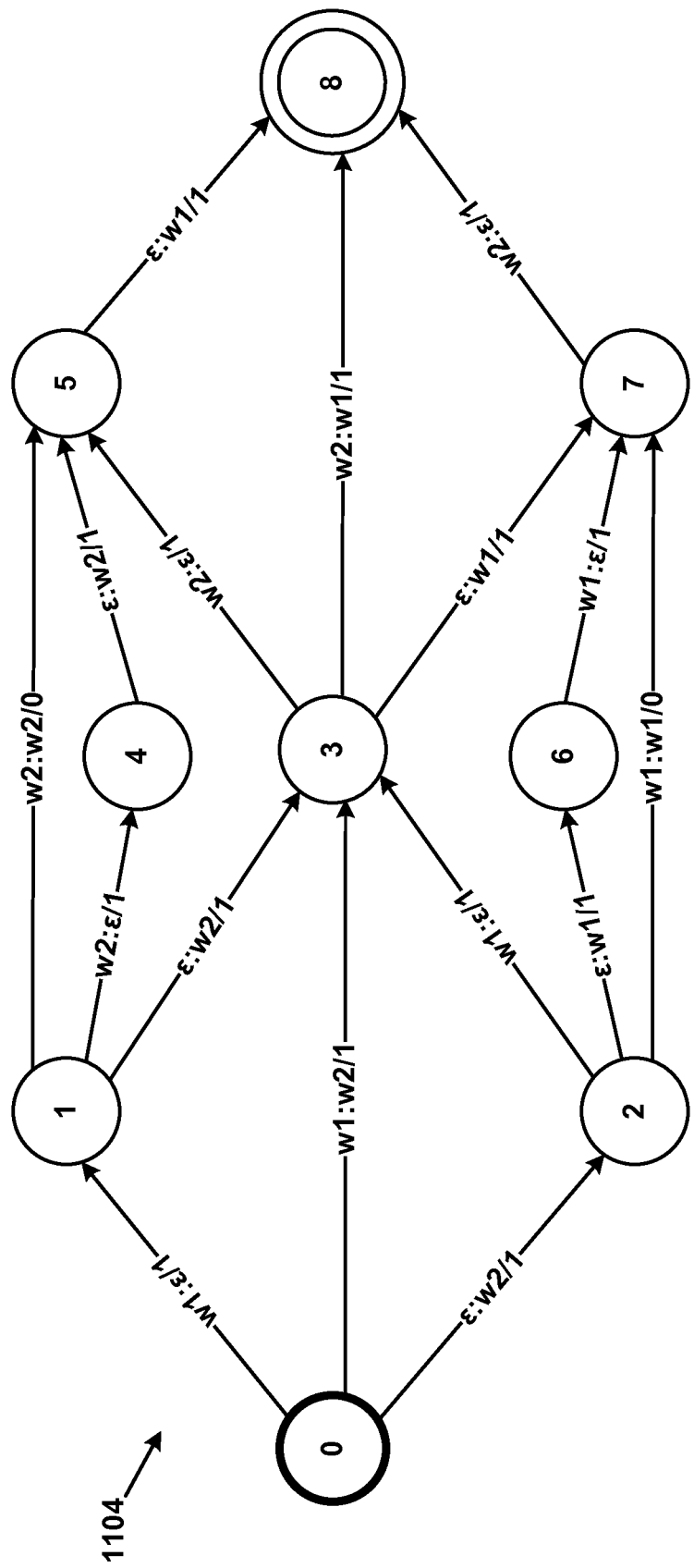

As an example, let S1 be an FST for the sentence "w1 w2." Then, the composition of S1∘T is shown in FIG. 11B. The FST in FIG. 11B can be used to map an input sentence to an edit distance between that input sentence and "w1 w2." For example, let S2 be an FST for the sentence "w2 w1." Then, the composition of S1∘T∘S2 represents the edit distance between "w1 w2" and "w2 w1." This composition, S1∘T∘S2, is shown as FST 1104 in FIG. 11C, and provides a path for each combination of edits (deletion, insertion, substitution) leading from "w1 w2" to "w2 w1", with an associated edit distance. Of course, the minimum edit distance is 2, representing two substitutions.

Figure 11D:
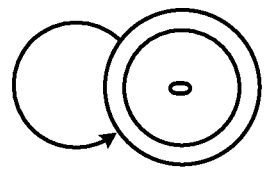
Figure 11D:
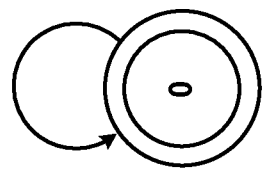

The size of edit transducer T is quadratic with respect to the number of words in the language. One possible way of reducing the complexity and size of T is to decompose T into two transducers T1 and T2. Transducer T1 may represent the "left half" of T, and may map symbols to edit operations. Transducer T2 may represent the "right half" of T and may map edit operations back to symbols. A decomposition of T is shown as FSTs 1106 and 1108 in FIG. 11D. Note that for these FSTs, the insert operation is denoted as <i>, the delete operation is denoted as <d>, and the substitute operation is denoted as <s>.

The composition S1∘T o S2 can now be expressed as (S1∘T1)∘(T2∘S2) due to the associative property of composition. Doing so replaces the quadratic-sized T with the linear-sized T1 and T2.

This construction may be used to compute the MBR value of a given path—represented by FST S—in $W_h$. Particularly, S∘T∘$\overline{W}_e$ can be computed, where $\overline{W}_e$ is the unweighted version of $W_e$. The result may accept strings of $W_e$ with a weight equal to the cost of their alignments with the given path represented by FST S. This results in a compact representation of the distance of the given path to every path in $W_e$.

D. Edit Transducer Factorization in the Log Semiring

Edit transducer factorization in the log semiring is similar to that of the edit transducer factorization in the tropical semiring. However, some possible differences may include use of a counting transducer as a way to count edit operations without eliminating alignments, use of a synchronization operation as a way to equate the labels of the various alignments for each pair of strings, and the use of automata determinization. This process may involve encoding the input and output symbols as a pair, determinizing the resulting FST as a finite-state automaton on a pair of symbols, and decoding the pairs back to input and output symbols. It should be understood that determinization of a non-deterministic automaton results in a deterministic automaton that recognizes exactly the same language.

Furthermore, unlike the tropical semiring method which computes the MBR value of only one hypothesis string, the log semiring method can be used to compute the values for all hypothesis paths simultaneously.

Figure 12A:
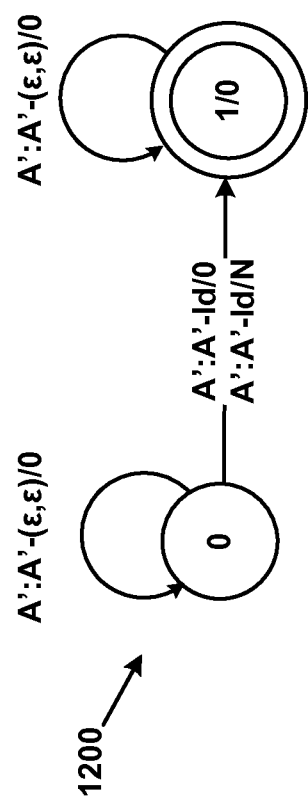
FIGS. 12A, 12B, and 12C also depict edit transducers, in accordance with example embodiments.

FIG. 12A depicts FST 1200, an edit transducer for the Levenshtein edit distance in the log semiring. The list of words is denoted by A, and A'=A U {E}. The term $$A':A'-(\epsilon,\epsilon)$$

denotes all transitions of the form x:y with x,y∈A' except for the empty transition ϵ:ϵ. Additionally, the term $$A':A'-Id$$

denotes all transitions of the form x:y with x,y∈A' and x≠y.

Instead of generating one path for each alignment with the cost of the alignment as weight, in FST 1200 the path for each alignment may be generated in multiple copies, so that the ⊕ operation in the log semiring yields the correct cost for the alignment. As a computational convenience, perfect alignments may be modeled explicitly, giving them a large but finite weight N. Otherwise, these alignments might not be taken into account.

Like for the tropical semiring, FST 1200 is quadratic in the size of the word list A. Thus, it may be beneficial to factor FST 1200. However, in doing so, complications may arise because, unlike in the tropical semiring, adding "bogus" edges for identity substitutions and relying on the ⊕ operation to eliminate them later may not work. Instead, the set of non-identity substitutions may be modeled explicitly. In particular, the unneeded edges may be added, but then cancelled out by adding a negated version of them in the signed log semiring (see above for a definition of the signed log semiring).

Figure 12B:
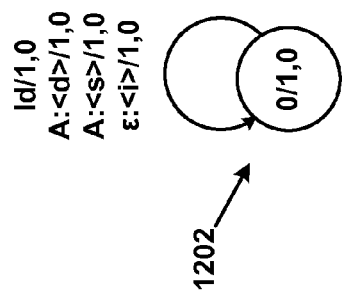
Figure 12C:
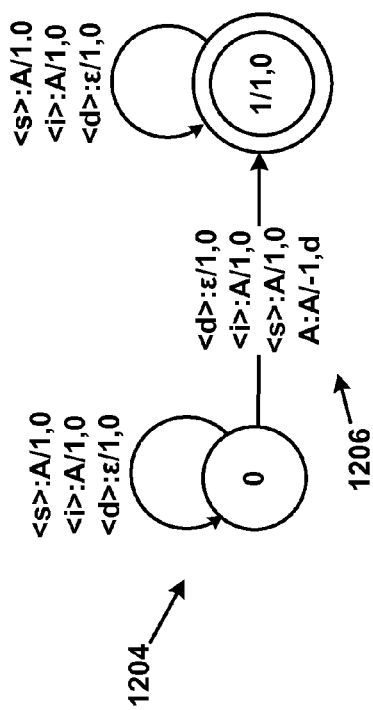

FIGS. 12A and 12B depict the left half (FST 1202) and the right half (FST 1204), respectively, of FST 1200 in the signed log semiring. The composition of FST 1202 and FST 1204 yield an edit transducer that is equivalent to FST 1200. The value d shown as one of transitions 1206 is a small positive value.

For this factorization of FST 1200, let T be FST 1200, T1 be FST 1202 and T2 be FST 1204. Thus, T=T1∘T2. $W_e$ and $W_h$ may be mapped from the log semiring to the signed log semiring by converting each weight x to (1,x). ($W_h$∘T1)∘(T2∘$W_e$) may be calculated to determine the edit distance between multiple evidence and hypothesis strings. After determinizing to eliminate negative weights, these values can be mapped back to the log semiring by converting (1,x) to x.

7. Example Operations

Figure 13:
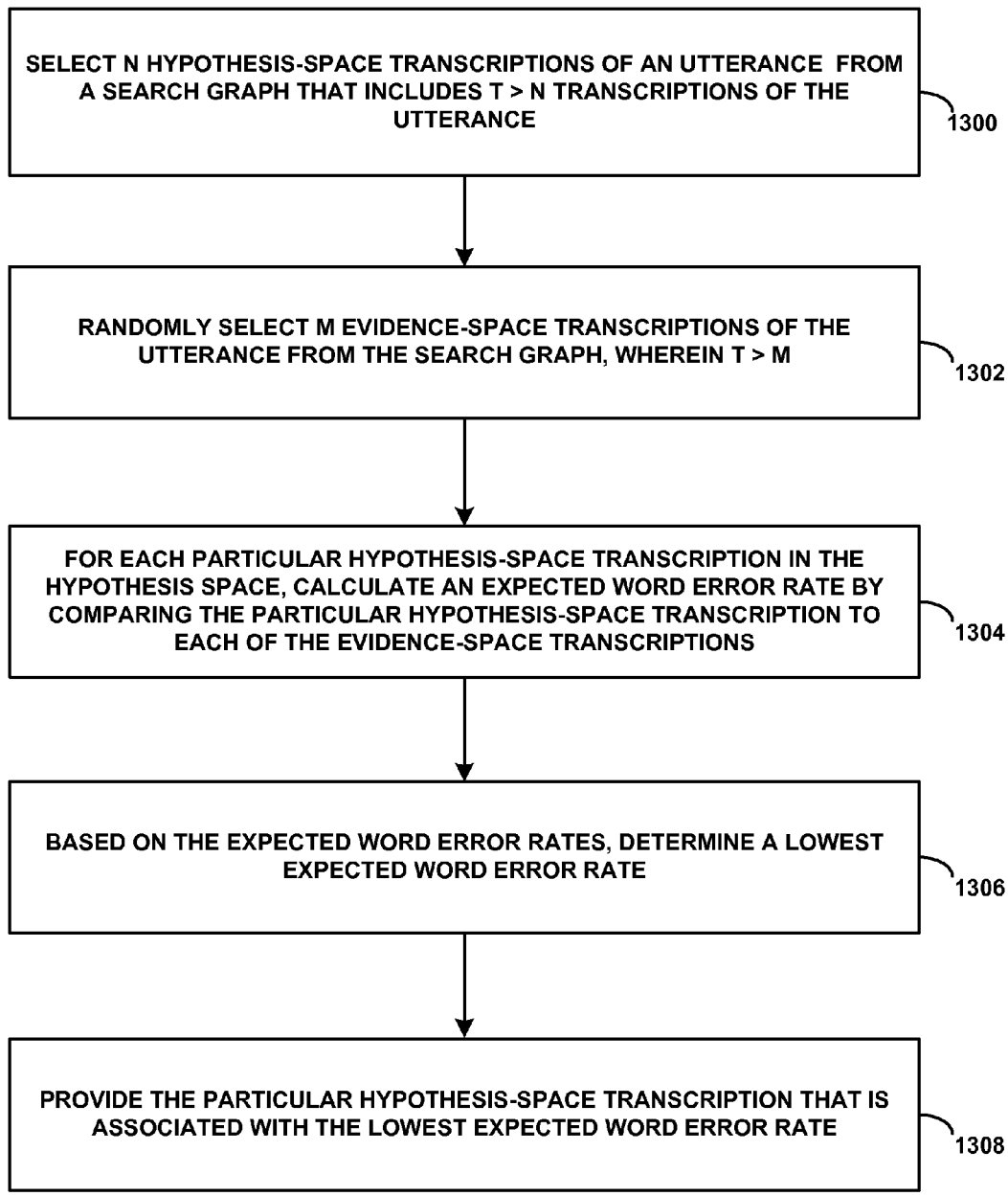
FIG. 13 depicts a flow chart, in accordance with an example embodiment.

FIG. 13 is a flow chart of an example embodiment. The steps illustrated by this flow chart may be carried out by various computing devices, such as client device 300, server device 200 and/or server cluster 220A. Aspects of some individual steps may be distributed between multiple computing devices.

At step 1300, n hypothesis-space transcriptions of an utterance may be selected from a search graph that includes t>n transcriptions of the utterance. Determining the n hypothesis space transcriptions may involve determining the n best transcriptions of the utterance according to a maximum a posteriori (MAP) technique. At step 1302, m evidence-space transcriptions of the utterance may be randomly selected from the search graph, where t>m.

The search graph may be implemented as an FST. This FST may include a composition of a language model FST and a dictionary FST. Alternatively or additionally, this FST may include a decomposed edit transducer.

At step 1304, for each particular hypothesis-space transcription, an expected word error rate may be calculated by comparing the particular hypothesis-space transcription to each of the evidence-space transcriptions. These comparisons may involve, for each particular evidence-space transcription, further steps of determining a probability that the particular evidence space transcription is a correct transcription of the utterance based on the utterance, determining an edit distance between the particular hypothesis-space transcription and the particular evidence space transcription, and calculating a product of the probability and the edit distance. In some embodiments, the edit distance may be a Levenshtein edit distance. Additionally, the expected word error rate may be the sum of each of the products associated with the particular evidence-space transcriptions.

Determining the edit distance may involve factoring an edit transducer in the tropical semiring into a left-half transducer and a right-half transducer. The edit transducer may include a finite-state transducer that maps edit operations to associated costs. At least one of the n hypothesis space transcriptions may be composed with the left-half transducer into a first composed transducer. Additionally, the right-half transducer may be composed with an evidence space transducer into a second composed transducer. The evidence space transducer may represent the m evidence-space transcriptions. Then, the first composed transducer may be composed with the second composed transducer.

In other embodiments, determining the edit distance may involve factoring an edit transducer in the log semiring into a left-half transducer and a right-half transducer. The edit transducer may include a finite-state transducer that maps edit operations to associated costs. A hypothesis space transducer may be composed with the left-half transducer into a first composed transducer. The hypothesis space transducer may represent the n hypothesis space transcriptions. Additionally, the right-half transducer may be composed with an evidence space transducer into a second composed transducer. The evidence space transducer may represent the m evidence-space transcriptions. Then, the first composed transducer may be composed with the second composed transducer.

At step 1306, based on the expected word error rates, a lowest expected word error rate may be determined. At step 1308, the particular hypothesis-space transcription that is associated with the lowest expected word error rate may be provided.

The search graph may include a directed acyclic graph, each edge of the directed acyclic graph associated with a probability. Randomly selecting the evidence-space transcriptions from the search graph may involve traversing the directed acyclic graph from a source node to a terminal node by repeatedly selecting edges according to the probability associated with each edge.

Some implementations may include receiving a representation of the utterance from a client device. Providing the particular hypothesis-space transcription that is associated with the lowest expected word error rate may involve providing the particular hypothesis-space transcription that is associated with the lowest expected word error rate to the client device. Alternatively or additionally, providing the particular hypothesis-space transcription that is associated with the lowest expected word error rate may involve providing the particular hypothesis-space transcription that is associated with the lowest expected word error rate on an output display of a computing device that performs at least one of the steps of FIG. 13.

8. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

For situations in which the systems discussed here collect personal information about users, the users may be provided with an opportunity to opt in/out of programs or features that may collect personal information (e.g., information about a user's preferences or a user's utterances made to an ASR system). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    selecting, by a computing device, n hypothesis-space transcriptions of an utterance from a search graph that includes t>n transcriptions of the utterance, wherein selecting the n hypothesis-space transcriptions comprises determining n best transcriptions of the utterance according to a maximum a posteriori (MAP) technique;
    randomly selecting m evidence-space transcriptions of the utterance from the search graph, wherein t>m;
    for each particular hypothesis-space transcription of the n hypothesis-space transcriptions, calculating an expected word error rate by comparing the particular hypothesis-space transcription to the randomly selected m evidence-space transcriptions;
    based on the expected word error rates, determining a lowest expected word error rate; and
    providing the particular hypothesis-space transcription that is associated with the lowest expected word error rate.

2. The method of claim 1, wherein comparing the particular hypothesis-space transcription to the randomly selected m evidence-space transcriptions comprises, for each particular evidence-space transcription of the selected m evidence-space transcriptions:
    based on the utterance, determining a probability that the particular evidence space transcription is a correct transcription of the utterance;
    determining an edit distance between the particular hypothesis-space transcription and the particular evidence space transcription; and
    calculating a product of the probability and the edit distance.

3. The method of claim 2, wherein the edit distance is a Levenshtein edit distance.

4. The method of claim 2, wherein determining the edit distance comprises:
    factoring an edit transducer in the tropical semiring into a left-half transducer and a right-half transducer, wherein the edit transducer includes a finite-state transducer that maps edit operations to associated costs;
    composing, into a first composed transducer, at least one of the n hypothesis space transcriptions with the left-half transducer;
    composing, into a second composed transducer, the right-half transducer with an evidence space transducer, wherein the evidence space transducer represents the m evidence-space transcriptions; and
    composing the first composed transducer and the second composed transducer.

5. The method of claim 2, wherein determining the edit distance comprises:
    factoring an edit transducer in the log semiring into a left-half transducer and a right-half transducer, wherein the edit transducer includes a finite-state transducer that maps edit operations to associated costs;
    composing, into a first composed transducer, a hypothesis space transducer with the left-half transducer, wherein the hypothesis space transducer represents the n hypothesis space transcriptions;
    composing, into a second composed transducer, the right-half transducer with an evidence space transducer, wherein the evidence space transducer represents the m evidence-space transcriptions; and
    composing the first composed transducer and the second composed transducer.

6. The method of claim 2, wherein the expected word error rate is the sum of each of the products associated with the particular evidence-space transcriptions.

7. The method of claim 1, wherein the search graph comprises a directed acyclic graph, each edge of the directed acyclic graph associated with a probability, and wherein randomly selecting the m evidence-space transcriptions from the search graph comprises traversing the directed acyclic graph from a source node to a terminal node by repeatedly selecting edges according to the probability associated with each edge.

8. The method of claim 1 further comprising:
    receiving a representation of the utterance from a client device, wherein providing the particular hypothesis-space transcription that is associated with the lowest expected word error rate comprises providing the particular hypothesis-space transcription that is associated with the lowest expected word error rate to the client device.

9. The method of claim 1, wherein providing the particular hypothesis-space transcription that is associated with the lowest expected word error rate comprises providing the particular hypothesis-space transcription that is associated with the lowest expected word error rate on an output display of the computing device.

10. The method of claim 1, wherein the search graph comprises a search graph finite state transducer (FST), and wherein the search graph FST comprises a composition of a language model FST and a dictionary FST.

11. An article of manufacture including a non-transitory computer-readable medium, having stored thereon program instructions that, upon execution by a computing device, cause the computing device to perform operations comprising:
    selecting n hypothesis-space transcriptions of an utterance from a search graph that includes t>n transcriptions of the utterance, wherein selecting the n hypothesis-space transcriptions comprises determining n best transcriptions of the utterance according to a maximum a posteriori (MAP) technique;
    randomly selecting m evidence-space transcriptions of the utterance from the search graph, wherein t>m;
    for each particular hypothesis-space transcription of the selected n hypothesis-space transcriptions, calculating an expected word error rate by comparing the particular hypothesis-space transcription to the randomly selected m evidence-space transcriptions;
    based on the expected word error rates, determining a lowest expected word error rate; and
    providing the particular hypothesis-space transcription that is associated with the lowest expected word error rate.

12. The article of manufacture of claim 11, wherein comparing the particular hypothesis-space transcription to the evidence-space transcriptions comprises, for each particular evidence-space transcription of the selected m evidence-space transcriptions:

based on the utterance, determining a probability that the particular evidence space transcription is a correct transcription of the utterance;

determining an edit distance between the particular hypothesis-space transcription and the particular evidence space transcription; and calculating a product of the probability and the edit distance.

13. The article of manufacture of claim 12, wherein the edit distance is a Levenshtein edit distance.

14. The article of manufacture of claim 12, wherein the expected word error rate is the sum of each of the products associated with the particular evidence-space transcriptions.

15. The article of manufacture of claim 11, wherein the search graph comprises a directed acyclic graph, each edge of the directed acyclic graph associated with a probability, and wherein randomly selecting the evidence-space transcriptions from the search graph comprises traversing the directed acyclic graph from a source node to a terminal node by repeatedly selecting edges according to the probability associated with each edge.

16. A computing device comprising:

at least one processor;

data storage; and program instructions stored in the data storage that, when executed by the processor, cause the computing device to perform operations comprising:

selecting n hypothesis-space transcriptions of an utterance from a search graph that includes t>n transcriptions of the utterance, wherein selecting the n hypothesis-space transcriptions comprises determining n best transcriptions of the utterance according to a maximum a posteriori (MAP) technique;

randomly selecting m evidence-space transcriptions of the utterance from the search graph, wherein t>m;

for each particular hypothesis-space transcription of the selected n hypothesis-space transcriptions, calculating an expected word error rate by comparing the particular hypothesis-space transcription to the randomly selected m evidence-space transcriptions;

based on the expected word error rates, determining a lowest expected word error rate; and providing the particular hypothesis-space transcription that is associated with the lowest expected word error rate.

17. The computing device of claim 16, wherein comparing the particular hypothesis-space transcription to each of the evidence-space transcriptions comprises, for each particular evidence-space transcription of the selected m evidence-space transcriptions:

based on the utterance, determining a probability that the particular evidence space transcription is a correct transcription of the utterance;

determining an edit distance between the particular hypothesis-space transcription and the particular evidence space transcription; and calculating a product of the probability and the edit distance.

18. The computing device of claim 16, wherein the search graph comprises a directed acyclic graph, each edge of the directed acyclic graph associated with a probability, and wherein randomly selecting the evidence-space transcriptions from the search graph comprises traversing the directed acyclic graph from a source node to a terminal node by repeatedly selecting edges according to the probability associated with each edge.

\* \* \* \* \*